United States Patent
Nagai et al.

(10) Patent No.: US 8,194,211 B2
(45) Date of Patent: Jun. 5, 2012

(54) TRANSFLECTIVE LIQUID CRYSTAL DISPLAY UNIT

(75) Inventors: Hiroshi Nagai, Kawasaki (JP); Michiaki Sakamoto, Kawasaki (JP); Kenichirou Naka, Kawasaki (JP); Kenichi Mori, Kawasaki (JP)

(73) Assignee: NLT Technologies, Ltd., Kanagawa (JP)

( * ) Notice: Subject to any disclaimer, the term of this patent is extended or adjusted under 35 U.S.C. 154(b) by 113 days.

(21) Appl. No.: 12/404,713

(22) Filed: Mar. 16, 2009

(65) Prior Publication Data

US 2009/0237600 A1    Sep. 24, 2009

(30) Foreign Application Priority Data

Mar. 18, 2008  (JP) .................................. 2008-69826

(51) Int. Cl.
  *G02F 1/1335* (2006.01)
(52) U.S. Cl. ........................................ 349/114; 349/113
(58) Field of Classification Search .................. 349/114, 349/113
  See application file for complete search history.

(56) References Cited

U.S. PATENT DOCUMENTS

| | | | |
|---|---|---|---|
| 6,885,416 B2* | 4/2005 | Luo et al. ...................... | 349/110 |
| 7,417,698 B2* | 8/2008 | Ozawa et al. .................. | 349/114 |
| 7,705,937 B2* | 4/2010 | Sakamoto et al. ............. | 349/114 |
| 2004/0032550 A1* | 2/2004 | Anno et al. .................... | 349/110 |
| 2006/0197895 A1* | 9/2006 | Kamijo et al. ................. | 349/114 |
| 2007/0002226 A1* | 1/2007 | Sakamoto et al. ............. | 349/114 |
| 2007/0236640 A1* | 10/2007 | Kimura ........................ | 349/141 |
| 2010/0149468 A1* | 6/2010 | Ina et al. ....................... | 349/114 |

FOREIGN PATENT DOCUMENTS

| | | |
|---|---|---|
| CN | 1892349 A | 1/2007 |
| JP | 2003-140190 A | 5/2003 |
| JP | 2003-270627 A | 9/2003 |
| JP | 2003-344837 A | 12/2003 |
| JP | 2006-017136 A | 1/2006 |
| JP | 2007-041572 * | 2/2007 |
| JP | 2007-041572 A | 2/2007 |
| JP | 2007-071938 A | 3/2007 |
| JP | 2007-199340 A | 8/2007 |
| TW | 200609574 A | 3/2006 |

* cited by examiner

*Primary Examiner* — Edward Glick
*Assistant Examiner* — Sang Nguyen
(74) *Attorney, Agent, or Firm* — Sughrue Mion, PLLC

(57) ABSTRACT

A LCD unit includes a reflective area and a transmissive area in each pixel, which are driven by respective drive electrode assemblies. A first substrate and a second substrate that sandwich therebetween a LC layer include respective shied films in the boundary area between the reflective area and the transmissive area.

7 Claims, 19 Drawing Sheets

TRANSFLECTIVE LIQUID CRYSTAL DISPLAY UNIT

This application is based upon and claims the benefit of priority from Japanese patent application No. 2008-069826, filed on Mar. 18, 2008, the disclosure of which is incorporated herein in its entirety by reference.

TECHNICAL FIELD

The present invention relates to a transflective liquid crystal display (LCD) unit and, more particularly, to a transflective LCD unit including a reflective area and a transmissive area in each pixel of the transflective LCD unit, wherein at least the transmissive area operates in a lateral-electric-field drive mode.

BACKGROUND ART

LCD units generally include a liquid crystal (LC) cell including a LC layer and a pair of transparent substrates sandwiching therebetween the LC layer, the LC cell defining an array of pixels for display of an image.

LCD units are categorized into a transmissive LCD unit and a reflective LCD unit. In general, the transmissive LCD unit includes the backlight source, and controls the transmission of the light from the backlight source to display an image. The reflective LCD unit includes a reflection film that reflects the external light, and uses the light reflected by the reflection film as a light source for the display of an image. The reflective LCD unit, that does not need the backlight source, is superior to the transmissive LCD unit in the view point of low power dissipation, thin thickness and light weight. However, the reflective LCD unit has the weakness that visibility of the screen is lowered in a dark environment because the reflective LCD unit uses the ambient light as the light source for the display of an image.

A transflective LCD unit is known as a LCD unit that has the advantage of both the transmissive LCD unit and the reflective LCD unit (for example, refer to Patent Publication-1). The transflective LCD unit includes a transmissive area and a reflective area in each pixel of the LCD unit. The transmissive area transmits therethrough the light emitted from the backlight source, to use the backlight source as the display light source. The reflective area includes a reflection film that reflects the external light and uses the reflected light as the display light source. The transflective LCD unit turns OFF the backlight source in a bright environment, and uses the reflective area to display an image to save the power. The transflective LCD unit turns ON the backlight source in a dark environment, and uses the transmissive area to display an image even in the dark environment.

Some LCD units operate in a lateral-electric-field drive mode, such as an in-plane-switching (IPS) mode or fringe-electric-field drive mode, such as a fringe-field-switching (FFS) mode. The IPS-mode LCD unit includes in each pixel a pixel electrode and a common electrode, that are formed on the same substrate to apply a lateral electric field to the LC layer The lateral-electric-field mode LCD unit realizes a wider viewing angle compared to a twisted-nematic(TN)-mode LCD unit, by rotating LC molecules in the LC layer in the direction parallel to the substrate surface for the display of an image.

The publications cited in this text include:
Patent Publication-1 (JP-2003-344837A);
Patent Publication-2 (JP-2006-017136A);
Patent Publication-3 (JP-2007-041572A);
Patent Publication-4 (JP-2003-140190A);
Patent Publication-5 (JP-2007-071938A).
Patent Publication-6 (JP-2003-270627A); and
Patent Publication-7 (JP-2007-199340A).

Patent Publication-2 describes an example of the lateral-electric-field drive mode LCD unit that includes both the transmissive area and the reflective area, i.e., transflective LCD unit. The transflective LCD unit described in Patent Publication-2 includes in the transmissive area a LC layer having a retardation of $\lambda/2$ for a light having a wavelength "$\lambda$" of 550 nm, and a $\lambda/2$ retardation film and a LC layer having a retardation of $\lambda/4$ in the reflective area. The transflective LCD unit drives the LC layer in a normally black mode. Compared to the transmission characteristic of the conventional transflective LCD unit operating in a TN mode or electrically-controlled birefringence (ECB) mode, the LCD unit operating in the lateral-electric-field mode in the transmissive area is known to have a higher viewing angle characteristic and thus be superior in the image quality.

However, in the transflective LCD unit described in Patent Publication-2, it is needed to reduce the cell gap of the LC layer in the reflective area. It is known that the threshold electric field (Ec) of the lateral electric field is generally expressed by the following formula:

$$E_c = \frac{\pi}{d}\sqrt{\frac{K_{22}}{\varepsilon_0 \varepsilon_a}} \tag{1}$$

where EC, d, K22, and $\in$ are the threshold electric field, cell gap that is the thickness of the LC layer, elastic coefficient and dielectric constant, respectively. From the above formula, it is understood that the smaller cell gap requires a larger threshold electric field (or a drive voltage of LC), and thus requires a smaller distance between the pixel electrode and the common electrode. This is because the electric field is inversely proportional to the distance between the pixel electrode and the common electrode and is proportional to the potential difference between the pixel electrode and the common electrode. The pixel electrode and common electrode are each generally configured by a comb-teeth electrode. The narrow distance between the comb-teeth electrodes reduces the area that contributes to the reflection of light to thereby reduce the reflectance of the reflective area. In the case where the ratio of the width of the comb-teeth electrodes to the distance between the comb-teeth electrodes is 2:3, for example, the area that contributes to the reflection of light is ⅗ of the total reflective area. For a larger reflective area, it is necessary to increase the ratio of the reflective area to the transmissive area in a pixel, which results in reduction of the transmissive area and thus reduces the image quality of the transmissive area.

Patent Publication-3 describes a solution to the problem of the reduced reflectance of the transflective LCD unit in Patent Publication-2. In the transflective LCD unit described in Patent Publication-3, the transmissive area includes a LC layer having a retardation of $\lambda/2$ without the $\lambda/2$ retardation film whereas the reflective area includes a LC layer having a retardation of $\lambda/4$. In addition, both the reflective area and transmissive area of each pixel include respective TFTs (thin-film-transistors) for connection between the data signal line and the corresponding pixel electrode, and respective common electrodes. Further, it is disclosed as an example that the reflective area and transmissive area are driven by drive signals having an inverted ON-OFF relationship therebetween. The inverted ON-OFF relationship of the drive signals is such that one of the drive signals is ON or active during the OFF period or inactive period of the other of the drive signals, and vice versa. The term inverted drive signals or inverted ON-OFF drive signals as used in this specification refer to drive signals having the inverted ON-OFF relationship therebetween.

The technique of Patent Publication-3 discloses that, in the absence of the applied voltage(driving signal voltage), the transmissive area operates a normally black mode wherein absence of the applied voltage provides a black state or a dark state, and the reflective area operates in a normally white mode wherein the reflective area assumes a bright state or white state in the absence of the applied voltage, whereby the entire reflective area can be used as the reflection film. This provides high reflectance for the reflective area.

However, in the technique of Patent Publication-3, since the transmissive area operates in the normally black mode whereas the transmissive area operates in the normally white mode, and accordingly, both the areas are driven by the inverted ON-OFF drive signals for display of the same image, there occurs leakage of an electric field beyond the interface between the reflective area and the transmissive area in the pixel. The electric field occurring in this state is the same as the electric field occurring in the ON state of the drive signal. This electric field involves substantially no problem upon display of a bright state because the change of transmitted light is extremely small compared to the brightness provided by the drive signals upon display of the bright state. On the other hand, when the transmissive area is driven in the normally black mode for display of the dark state, a strong electric field occurs at the boundary area between the reflective area and the transmissive area. This electric field changes orientation of LC molecules, to change the polarization of the light transmitted through the interface, and thus generates leakage of light, which degrades a contrast ratio of the LCD unit. A light shield film is thus provided partially on the counter substrate for suppressing the leakage light at the boundary area.

However, in the LCD unit described in Patent Publication-3, unlike the case of Patent Publication-1 where both the transmissive area and reflective area are driven in the normally black, there may be a reflected light reflected by the shield film if the light emitted from the backlight source passes in a slant direction through the position where the orientation of the LC molecules in the reflective area is changed, or if the orientation of LC molecules in the reflective area is changed upon display of the dark state in the presence of the applied voltage. This reflected light may be further reflected by the reflection film to cause a leakage light. In the LCD unit of Patent Publication-3, due to the normally white mode of the reflection area, the reflectance of the reflective area is increased because all the area of the reflection film can be used for reflection. However, for prevention of the leakage light in the slant direction at the interface, a shield film having a larger width than an ordinary shield film is needed. This causes the problem of reduction in the effective opening ratio of the pixel by an increased width of the shield film The effective opening ratio as used herein refers to a ratio of the effective opening area of the pixel passing therethrough the light to the total pixel area.

Patent Publications-4 and -5 describe provision of a shield film in the boundary area for prevention of the leakage light generated from the backlight source due to the disturbance of orientation of the LC molecules caused by a slope area that adjusts the thickness of the LC layer at the step difference between the transmissive area and the reflective area. In this case, the shield film cannot prevent leakage of the re-reflected light generated at a sloped portion or stepped portion at the boundary area formed by the step difference or generated in the reflective area. For example, it is disclosed in the technique of Patent Publication-5 that the leakage light caused by the disturbance of the orientation of LC molecules due to the step difference between the reflective area and the transmissive area can be suppressed at the boundary by a shield film on the counter substrate. However, in this publication, both the reflective area and transmissive area are covered by a common transparent electrode, and the influence by occurring of the electric filed at the boundary area between the reflective area and the transmissive area is not considered. Therefore, the effect of the suppression is limited for the different drive scheme as used in the technique of Patent Publication-2. The drive scheme of Patent Publication-2 causes the disturbance of orientation of LC molecules not only in the vicinity of the TFT (thin-film-transistor) substrate but also in the entire cell gap of the LC layer in the boundary area. That is, only the shield function provided in the vicinity of the TFT substrate cannot well suppress the leakage light. In addition, the external light incident from the front side of the LCD unit is reflected by the shield film formed as a metallic film on the TFT substrate, to thereby degrade the image quality of the LCD unit. The term "boundary area" as used above refers to the area including the boundary between the reflective area and the transmissive area and the vicinity of the boundary.

Patent Publication-6 discloses a structure wherein a shield film is formed on at least one of the TFT substrate and counter substrate in the boundary area between the reflective area and the transmissive area. However, similarly to Patent Publications-4 and -5, both the reflective area and transmissive area are covered by a common transparent electrode and connected together in this publication, whereby an electric filed is not generated in the boundary area between the transmissive area and the reflective area. Thus, the influence caused by occurring of the electric field is not considered in this publication, and thus the slope area, in which a thickness adjustment layer is formed between the reflective area and the transmissive area, is shielded by a shield film as the boundary area. Therefore, the effect of the suppression is limited for the different drive scheme as used in the technique of Patent Publication-2. In addition, the light incident from the front side of the LCD unit may cause degradation of the image quality due to the influence by the disturbance of the orientation of the LC molecules unless the boundary area between the transmissive area and the reflective area is shielded.

Patent Publication-7 discloses a structure of shielding between adjacent pixels. In this structure, a shield film is provided on the TFT substrate between adjacent pixel electrodes, and another shield film is also provided on the counter substrate. The another shield film on the counter substrate has a width smaller than the gap between the reflective electrode of one of adjacent pixels and the reflective electrode of the other of the adjacent pixels. If operation of this LCD unit in Patent Publication-7 is similar to that described in Patent Publication-2, the backlight incident onto the transmissive area cannot be shielded by the shield film on the counter substrate, to degrade the image quality. At the same time, the light incident from the front side of the LCD unit may also cause degradation of the image quality due to scattering by the disturbance of the orientation of the LC molecules in the boundary area and reflection by the shield film formed on the TFT substrate. In the structure such as described in Patent Publications-4 to -7, the drive electrodes of the reflective area and drive electrode in each pixel are connected together to have the same potential. Thus, the influence by the electric field in the boundary area between the reflective area and the transmissive area is not considered, although there is some concern as to the disturbance of the orientation of the LC molecules only in the slope area due to the thickness adjustment layer provided in the boundary area. However, the effect of this shield structure is limited for the different drive scheme as used in the technique of Patent Publication-2, so long as the conventional configuration is considered.

SUMMARY OF THE INVENTION

In view of the above problems involved in the LCD units of the related art, it is an object of the present invention to provide a LCD unit which is capable of preventing the leakage light caused by the electric field in the boundary area between the reflective area and the transmissive area to improve the image quality of the LCD unit and thus achieving a higher image quality.

The present invention provides a liquid crystal display (LCD) unit including a liquid crystal (LC) cell including a LC layer and first and second substrates sandwiching therebetween the LC cell, the LC cell defining a pixel including a reflective area and a transmissive area, wherein: the second substrate includes, in the transmissive area, a first electrode assembly that drives the LC layer in the transmissive area, and, in the reflective area, includes a reflection film and at least a part of a second electrode assembly that drives the LC layer in the reflective area; and further the first and second substrates include first and second shield members, respectively, at a boundary between the reflective area and the transmissive area and in a vicinity of the boundary, the second shield member shielding at least a space between the first electrode assembly and the second electrode assembly as viewed perpendicular to the substrates.

The above and other objects, features and advantages of the present invention will be more apparent from the following description, referring to the accompanying drawings.

EMBODIMENTS OF THE INVENTION

Figure 1:
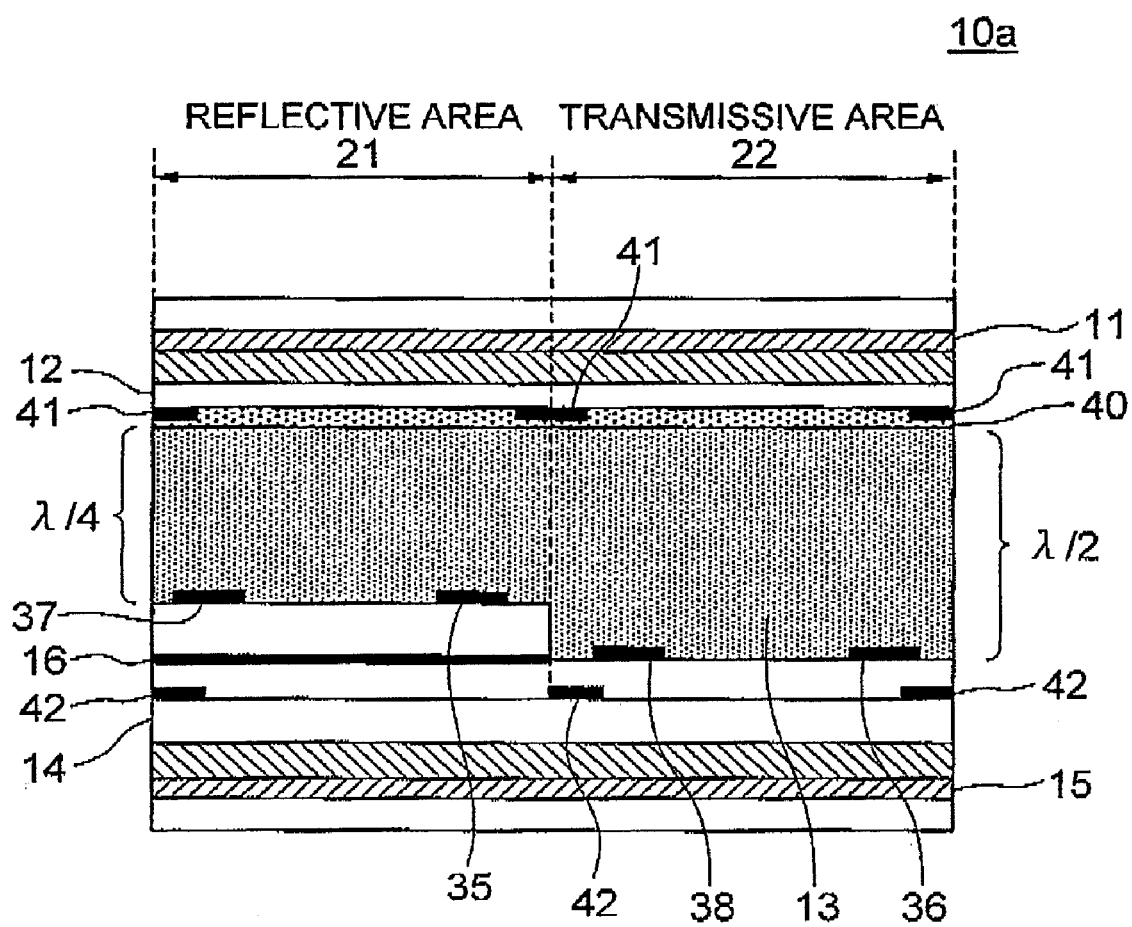
FIG. 1 is a sectional view of a LCD unit according to a first exemplary embodiment of the present invention.

In the basic configuration, the LCD unit of the present invention includes a liquid crystal (LC) cell including a LC layer and first and second substrates sandwiching therebetween, including a reflective area and a transmissive area. The second substrate includes, in the transmissive area, a first electrode assembly that drives the LC layer in the transmissive area, and, in the reflective area, includes a reflection film and at least a part of a second electrode assembly that drives the LC layer in the reflective area; and the first and second substrates include first and second light shield members, respectively, at a boundary between the reflective area and the transmissive area and in a vicinity of the boundary, the light shield members shielding at least a gap between the first electrode assembly and the second electrode assembly as viewed perpendicular to the substrates.

In the above configuration of the LCD unit, the light shield films formed on both the first and second substrates effectively intercept the leakage light substantially without reducing the effective opening ratio of each pixel, thereby achieving a LCD unit having a higher image quality.

The LCD unit of the present invention may have a configuration wherein the first electrode assembly drives LC molecules in the LC layer in the transmissive area by a lateral electric field, and the light shield member of the second substrate underlies the first electrode assembly and the at least a part of the second electrode assembly in the second substrate. In an alternative, the LCD unit may have a configuration wherein the first and second electrode assemblies each drive LC molecules in the LC layer by a lateral electric field, and the light shield member of the second substrate underlies the first and second electrode assemblies in the second substrate. For the latter configuration, the LCD unit may be such that the first and second electrode assemblies each include a pixel electrode and a common electrode, and are driven by respective drive signals that have an inverted ON-OFF relationship therebetween.

The LCD unit may have a configuration wherein the first and second electrode assemblies are each configured by a transparent film. The LCD unit may have a configuration wherein the light shield member is configured by a metallic film having a surface treated for reduction of reflectance or a resin film that includes therein carbon additives. The LCD unit may have a configuration wherein the second substrate includes a gate signal line, a common-electrode line and a data signal line that underlie the reflection film, and the light shield member of the second substrate is configured by a pile of at least two films selected from the group consisting of the reflection film, gate signal line, common-electrode line and data signal line.

The LCD unit may have a configuration wherein the light shield member of the second substrate includes a pile of the reflection film and gate signal line, a pile of the reflection film and data signal line, or a pile of the reflection film and common-electrode line. The LCD unit may have a configuration wherein the reflection film underlies the second electrode assembly in the second substrate, and the light shield member of the second substrate underlies the reflection film.

The LCD unit may have a configuration wherein at least a part of the first electrode assembly is configured by a transparent film, and the shield member of the second substrate ranges between an edge of the reflection film and a position of the transmissive area which is 4 µm or more apart in a direction opposite to the reflective area from an edge of the transparent film nearest to the reflective area. In an alternative, the LCD unit may have a configuration wherein the first and second electrode assemblies each include a transparent film, and the light shield member of the second substrate ranges between an edge of the reflection film and a position of the transmissive area which is 4 µm or more apart in a direction opposite to the reflective area from an edge of the transparent film in the transmissive area nearest to the reflective area.

Now, exemplary embodiments of the present invention will be described with reference to accompanying drawings, wherein similar constituent elements are designated by related reference numerals throughout the drawings.

FIG. 1 shows a LCD unit according to a first embodiment of the present invention. The LCD unit 10a includes a first polarizing film 11, a counter substrate 12, a LC layer 13 having a homogeneously-oriented initial orientation, a TFT substrate 14 and a second polarizing film, which are arranged in this order as viewed from the front screen of the LCD unit. The LCD unit 10 is configured as a transflective LCD unit that includes the reflective area 21 and the transmissive area 22 in each pixel. In this embodiment and the following embodiments, a pixel electrode 36 and a common electrode 38 are provided in the transmissive area 22 as the first electrode assembly, whereas a pixel electrode 35 and a common electrode 37 are provided in the reflective area 21 as the second electrode assembly.

The reflective area 21 is further provided with a reflection film 16 on the TFT substrate 14 between the second polarizing film 15 and the LC layer 13 for reflecting the external light incident from the first polarizing film 11. The reflective film 16 may have any configuration so long as the reflection film effectively reflects the light incident from the first polarizing film 11. However, the reflection film 16 preferably has an uneven surface, such as wavy form, for improving the scattering performance of the LCD unit. It is shown in FIG. 1 that each of the polarizing films 11 and 15 is sandwiched between a pair of protective films that may have a specific retardation.

The pixel electrode 35 for driving the LC layer in the reflective area 21, the pixel electrode 36 for driving the LC layer in the transmissive area 22, and both the common electrodes 37 and 38 for applying the reference potential may be provided as the topmost layer of the TFT substrate 14, or may be additionally covered by an insulation film on the electrodes. The light source for the reflective area 21 is the external light incident from the first polarizing film 11 whereas the light source for the transmissive area 22 is configured by a backlight unit (not shown) provided on is the rear side of the second polarizing film 15.

The thickness of the LC layer 13 in the transmissive area 22 may be determined so that the retardation of the LC layer calculated from the refractive index of the LC material assumes $\lambda/2$ for the light having a wavelength ($\lambda$) of 550 nm, and is for practical purpose, adjusted to $(\lambda/2)+$additional$\beta$ in this embodiment. This is because the effective retardation of the LC layer is determined at $\lambda/2$ in consideration that the rotation of LC molecules at the central portion of the cell gap is somewhat suppressed as compared to the LC molecules in the vicinity of the substrates and this suppression reduces the effective retardation from $(\lambda/2)+\beta$ down to $\lambda/2$. For example, by setting the retardation $\Delta$nd of the LC layer at $\Delta$nd=300 nm, the effective retardation $\Delta$nd(eff) thereof is 275 nm which is equal to $\Delta$nd(eff)=$\lambda/2$=550 nm/2.

For the transmissive area 22, the first polarizing film 11 is arranged so that the optical axis of the first polarizing film 11 is perpendicular to the optical axis of the second polarizing film 15, and also perpendicular or parallel to the orientation of the LC layer 13 upon display of a dark state. This arrangement allows the linearly-polarized light passed by the second polarizing film 15 from the backlight unit upon display of the dark state may pass through the LC layer 13 as it is, whereby the linearly-polarized light passed by the LC layer 13 coincides with the direction of the absorption axis of the first polarizing film 11 for interception of the light. Here, if the transmissive area 22 and reflective area 21 are driven by drive signals having the same phase potential and the potential difference between the pixel electrode and the common electrode is zero, or more precisely when this potential difference is below the potential corresponding to the threshold electric field at which the LC molecules start rotation from the initial orientation, there arises the problem that the transmissive area 22 is a dark state whereas the reflective area 21 is a bright state.

For solving this problem, drive voltage phases having an inverted ON-OFF relationship therebetween are applied to the reflective area 21 and transmissive area 22, thereby allowing both the areas to display the same image such as black and white. The term "drive voltage" as used herein is a potential difference that is applied between the pixel electrode and the common electrode in each of the reflective area and transmissive area of each pixel.

The counter substrate 12 is provided with a color filter layer 40 in each pixel, and a first light shield film 41 in the opposite boundary area in the counter substrate 12, i.e., the boundary between adjacent pixels and between the reflective area 21 and the transmissive area 22 in each pixel and the vicinity of the boundary. The TFT substrate 14 is provided with a second light shield film 42 in the boundary area between the reflective area 21 and the transmissive area 22. Examples of the material for the first shield is film 41 and the second light shield film 42 include a metallic film, such as chromium and nickel molybdenum alloy, and resin film. The metallic film may be used preferably after being subjected to a surface treatment for reduction of reflectance, and the resin film may be used including resin added with additives such as carbon. The second shield film 42 may be added as a separate film, or may be configured by a versatile film which also acts as the common electrode line, data signal lines or gate signal line which are connected to the pixel electrodes 35, 36 or common electrodes 37 and 38. The second shield film 42 may be a versatile film which acts as the reflection film 16 in the reflective area 21.

Figure 8A:
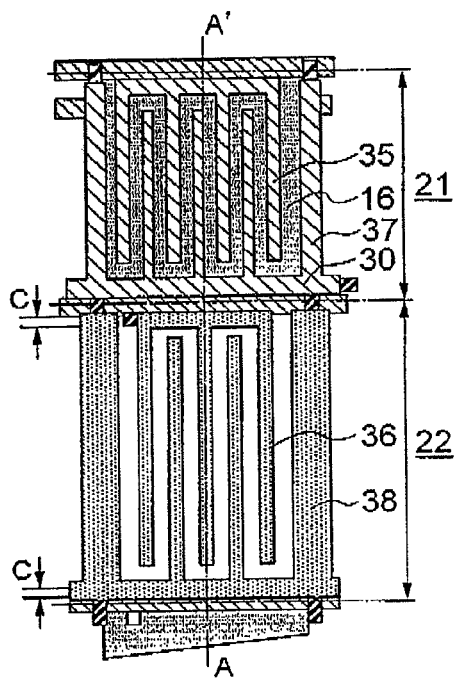
FIGS. 8A to 8C are a top plan view of the topmost layer, a top plan view of the intermediate film and a sectional view, respectively, showing the TFT substrate in a LCD unit of a modification of the first exemplary embodiment wherein the second shield film is configured by the second common electrode line.

If either the pixel electrode 36 or common electrode 38 is configured as a transparent electrode, the first shield film 41 and second shield film 42 may be arranged below the reflection film 16 and between the edge of the reflection film 16 and a range αwhich is 4 μm or more further from the edge of the pixel electrode 36 or common electrode 38 in the direction away from the reflective area 21. For example, as shown in FIGS. 8A and 8C, the first and second shield films 41, 42 may range the space (C) between the edge of the reflection film 16 and the range which is 4 μm or more further from the pixel electrode 36 or common electrode 38 in the direction away from the reflective area 21, for shielding the leakage light.

Figure 2:
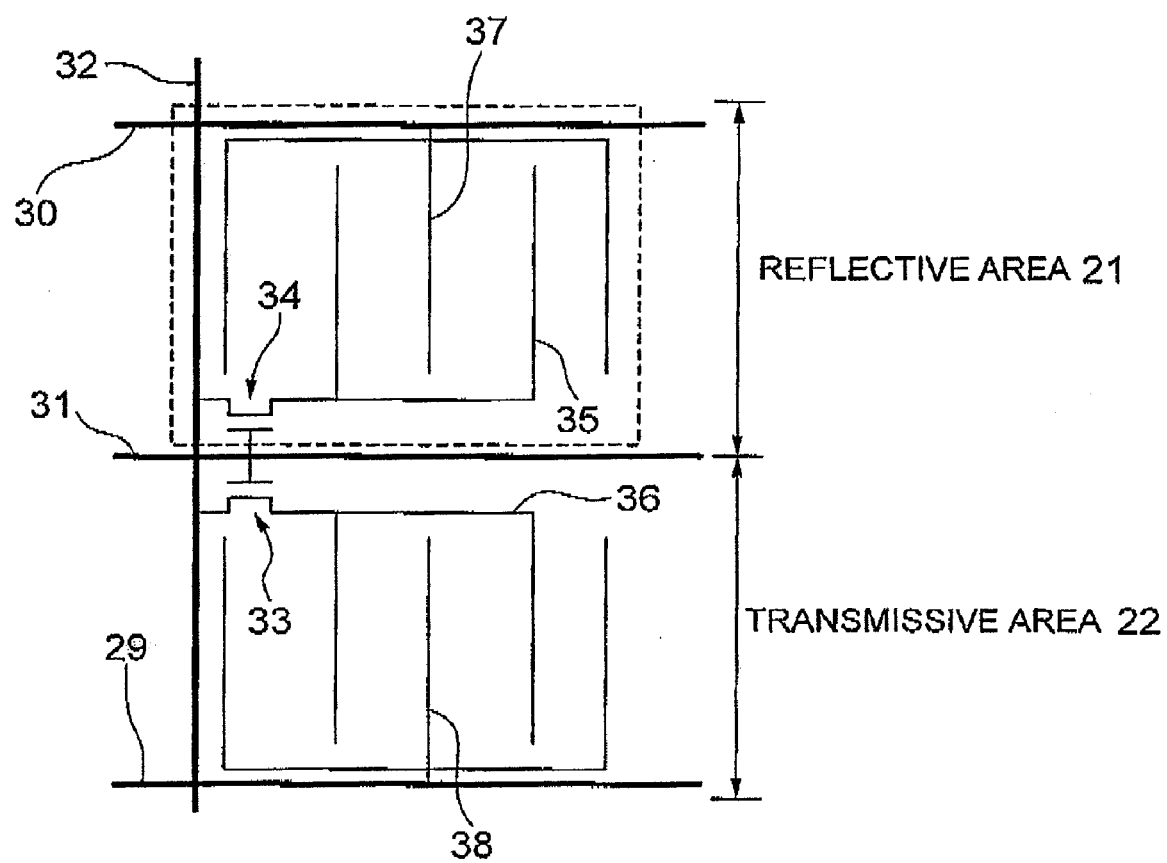
FIG. 2 is a top plan view of the LCD unit of the first embodiment of the present invention.

Operation of the LCD unit 10 of the first exemplary embodiment will be described hereinafter. FIG. 2 exemplifies a top plan view of a pixel formed on the TFT substrate 14 in the LCD unit 10 of FIG. 1. On the TFT substrate 14, there is a gate signal line 31, a data signal line 32 extending perpendicular to the gate signal line 31, and a TFT pair in the vicinity the of intersection of each signal line and each data signal line. The pair of TFTs includes a TFT 33 provided for the transmissive area 22 and a TFT 34 provided for the reflective area 21. The TFTs 33, 34 each include a gate connected to the gate signal line 31, and source/drain regions, one of which is connected to the data signal line 32 and the other of which is connected to the pixel electrode 35, 36 in one of the reflective area 21 and transmissive area 22 in each pixel. The common electrodes 37 and 38 are provided in the reflective area 21 and transmissive area 22, respectively, of each pixel, and each have a portion extending parallel to the gate signal line 31 and a projection that enters the reflective area 21 or transmissive area 22 to extend parallel to the pixel electrode 37 or 38. The common electrodes 37 and 38 are each applied with a common-electrode signal that is common to the plurality of pixels.

In the reflective area 21, the orientation of LC molecules in the LC layer 13 is controlled by the electric field generated by the potential difference applied between the pixel electrode 35 and the common electrode 37. Similarly, in the transmissive area 22, the orientation of LC molecules in the LC layer 13 is controlled by the electric field generated by the potential difference applied between the pixel electrode 36 and the common electrode 38. It is to be noted that the pixel electrode 35 of the reflective area 21 and the pixel electrode 36 of the transmissive area 22 are connected to the respective TFTs 33 and 34, which are connected to the same gate signal line 31 and the same data signal line 32. The orientation of the LC layer 13 in the reflective area 21 is controlled by the electric field generated by the potential difference between the pixel electrode 35 and the common electrode 37 after the TFT 34 is turned ON. The orientation of the LC layer 13 in the transmissive area 22 is controlled by the electric field generated by the potential difference between the pixel electrode 36 and the common electrode 38.

Although the same drive signal is provided to the reflective area 21 and the transmissive area 22, the separated TFTs 33 and 34 are provided respectively to the reflective area 21 and the transmissive area 22. This is because the potential fluctuation of the pixel electrode 36 in the transmissive area 22 and the pixel electrode 35 in the reflective area is different therebetween, after the TFTs 33, 34 that have applied the same drive signal are turned OFF.

In the above description, TFTs 33 and 34 are connected to the same gate signal line and the same signal line; however, these TFTs may be connected to different gate signal lines and/or different data signal lines.

Figure 3A:
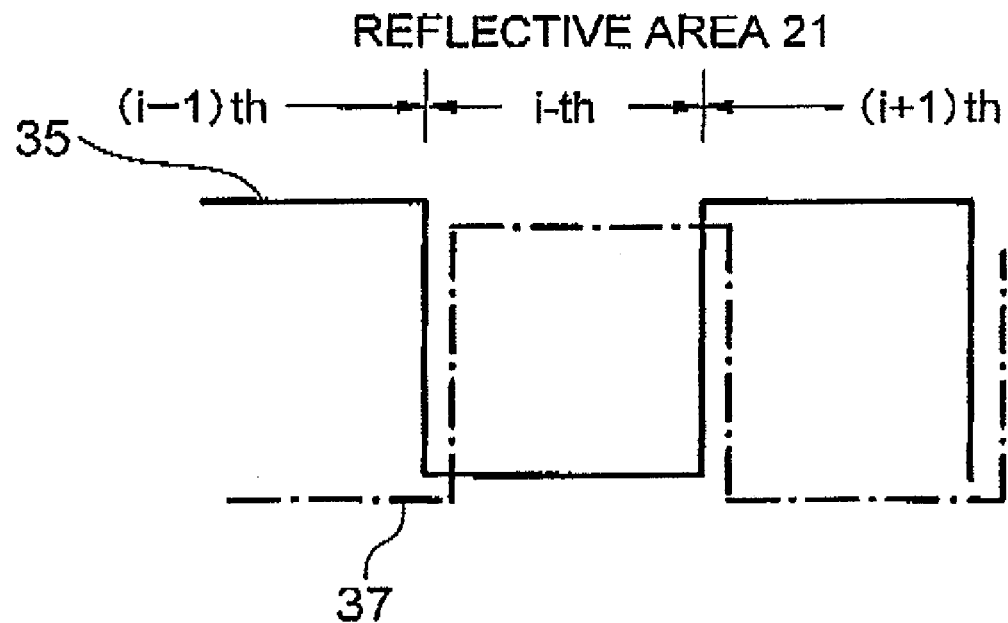
FIGS. 3A and 3B are waveform diagrams of the drive signals for the reflective area and transmissive area, respectively, at a stage.
Figure 3B:
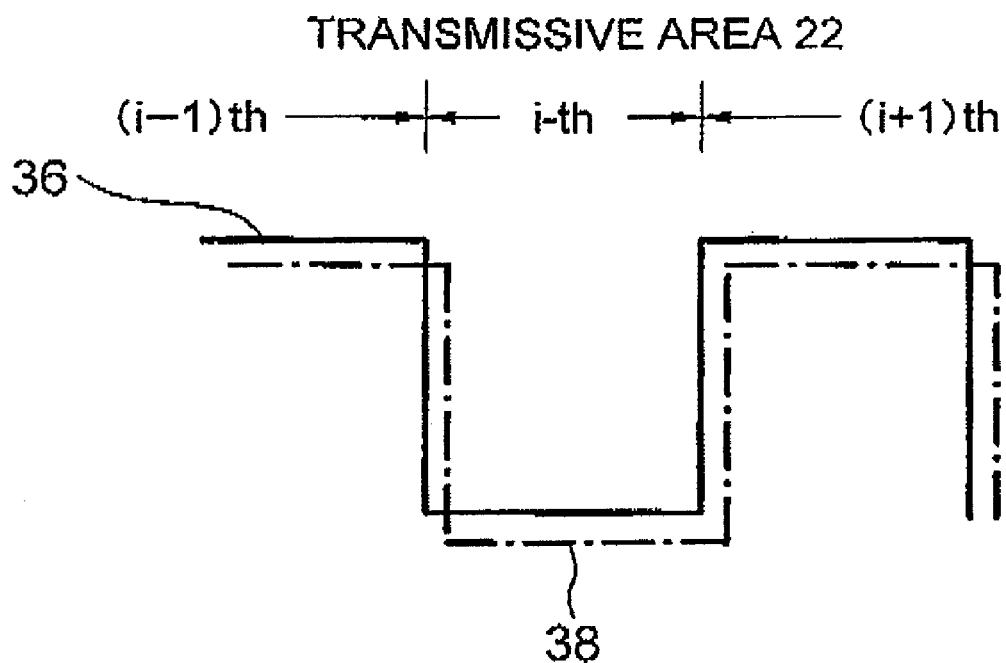

FIG. 3A shows a drive signal waveform of the reflective area 21 at an operational stage of i-th frame, whereas FIG. 3B shows a drive signal waveform of the transmissive area 22 at the same operational stage. The common-electrode signal is inverted between frames and between rows in the case of a gate-line inversion drive scheme. FIGS. 3A and 3B show this situation wherein the common electrodes 37, 38 are driven by respective common-electrode signals which have an inverted relationship therebetween and are inverted between frames to alternately assume 0 volt and 5 volt, for example. Since the TFTs 33, 34 are connected to the same data signal line, the pixel signal applied to the pixel electrode 35 is the same as the pixel signal applied to the pixel electrode 36. As understood from FIG. 3A, a 0-volt data signal is applied to the pixel electrode 35 and a 5-volt data signal is applied to the electrode 37 in the i-th frame, whereby the potential difference therebetween is at the maximum, 5 volt, by which the LC layer 13 is driven in the reflective area 21. In the same i-th frame, a 0-volt signal is applied to the common electrode 38, whereby the potential difference between the pixel electrode 36 and the common electrode 38 is 0 volt, and thus the LC layer 13 is not driven in the transmissive area 22. In the (i−1)th frame and (i+1) frame, the situation is opposite wherein the LC layer 13 in the reflective area 21 is not driven whereas the LC layer 13 in the transmissive area 22 is driven. Thus, the LC layer in the reflective area 21 is driven by drive signals having an inverted ON-OFF relationship therebetween, whereas the LC layer in the transmissive area 22 is not driven due to the drive voltages having the same potential.

Figure 4A:
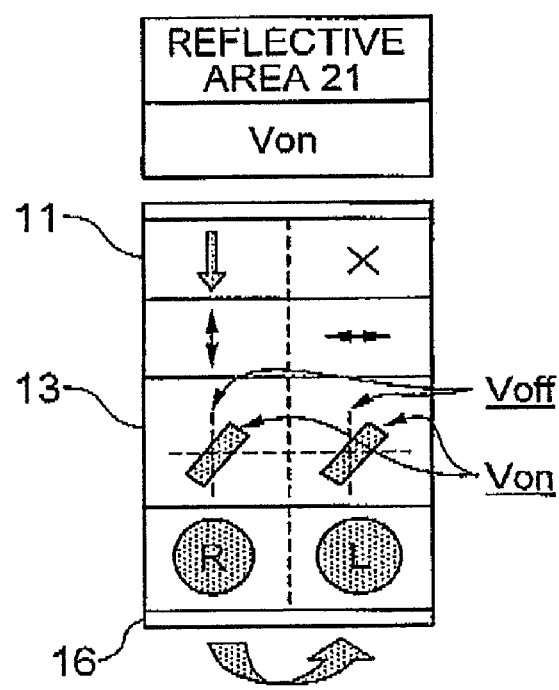
FIGS. 4A and 4B are diagrams showing polarization of light in the reflective area and transmissive area, respectively, upon application of the drive signals shown in FIGS. 3A and 3B, respectively.
Figure 4B:
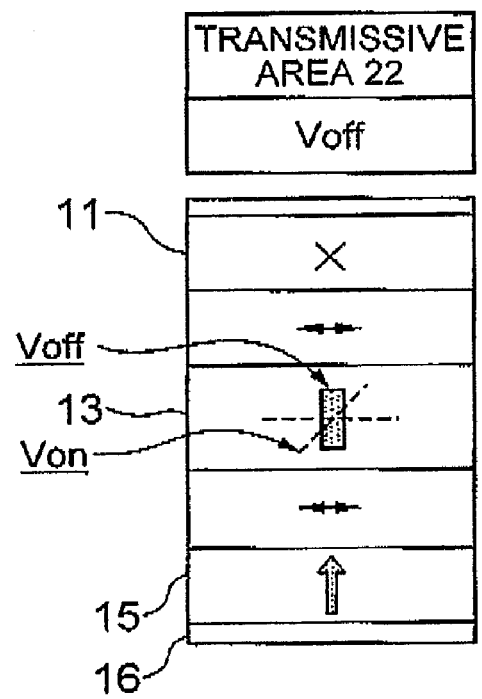

FIGS. 4A and 4B show polarization of light in the reflective area 21 and transmissive area 22 when the signals of i-th frame shown in FIGS. 3A and 3B are applied to those areas. In FIGS. 4A and 4B, the notation employed therein is such that a thick arrow denotes an incident light, a double-pointed arrow denotes polarization direction of the linearly-polarized light traveling at the position a thick bar shows the orientation of LC molecules in the LC layer 13, a character R encircled denotes a clockwise-circulary-polarized light, a character L encircled denotes a counterclockwise-circularly-polarized light, and a cross mark (x) denotes interception of light at the position. The orientation of LC molecules is changed between the initial orientation at the absence (Voff) of applied voltage and the orientation defined by the presence (Von) of applied voltage. The polarization or orientation direction is expressed here by an angle relative to the horizontal direction in these figures, which is defined at zero degree.

The arrangement of the pixel electrode 35 and common electrode 37 is determined such that the signal shown in FIG. 3A allows the orientation of the LC molecules in the LC layer 13 in the reflective area 21 to rotate by about 45 degrees. In the reflective area 21, as shown in FIG. 4A, the external light having a 90-degree linearly-polarized state and passed by the first polarizing film 11 is incident onto the LC layer 13 as it is, i.e., without a change of polarization. In this embodiment the effective retardation of the LC layer 13 in the reflective area 21 is set at about λ/4 when the orientation of LC layer 13 in the reflective area 21 is rotated by 45 degrees from the polarization of incident light, whereby the light passed by the LC layer 13 assumes a clockwise-circularly-polarized light. This clockwise-linearly-polarized light is reflected by the reflection film 16 to change into a counterclockwise-circularly-polarized light, which is again passed by the LC layer 13 to assume a linearly-polarized light having a polarization direction that is 90 degrees rotated from the original polarization of the light upon incidence onto the LC layer 13 for the first time. Thus, the light passed by the LC layer 13 has a polarization parallel to the absorption axis of the first polarizing film 11. Accordingly, the light reflected by the reflection film 16 cannot pass through the first polarizing film 11, as shown by the mark x in FIG. 4A, whereby the reflective area 21 represents a dark state.

On the other hand, in the same i-th frame, the signal shown in FIG. 3B cannot generate an electric field in the transmissive area 22 between the pixel electrode 36 and the second common electrode 38, whereby orientation of the LC molecules in the LC layer 13 stays at 90 degrees. Thus, the 0-degree-linearly-polarized light passed by the second polarizing film 15 passes through the LC layer 13 as it is, i.e., without a change of polarization, to be incident onto the first polarizing film 11. Therefore, the light incident onto the first polarizing film 11 through the LC layer 13 cannot pass through the first polarizing film 11, whereby the transmissive area 22 also represents a dark state.

As described heretofore, the common-electrode signals applied to the common electrodes 37 and 38 and having an inverted relationship therebetween provides drive signals having an inverted ON-OFF relationship therebetween, which allows the same pixel signal applied to the pixel electrodes 35 and 36 to rotate only the orientation of LC layer 13 in the reflective area 21. This allows the transmissive area 22 to represent a dark state when the reflective area 21 represents a dark state while applying the same data signal to both the reflective area 21 and transmissive area 22. That is, both the areas can represent the same image without applying different data signals to the reflective area 21 and transmissive area 21.

Figure 5A:
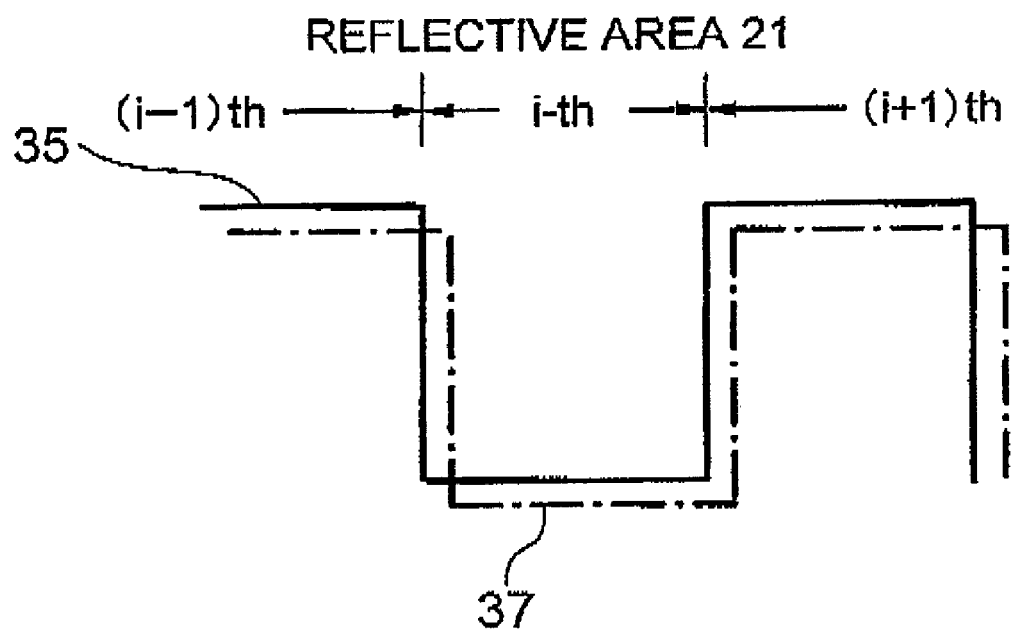
FIGS. 5A and 5B are waveform diagrams of the drive signals for the reflective area and transmissive area, respectively, at another stage.
Figure 5B:
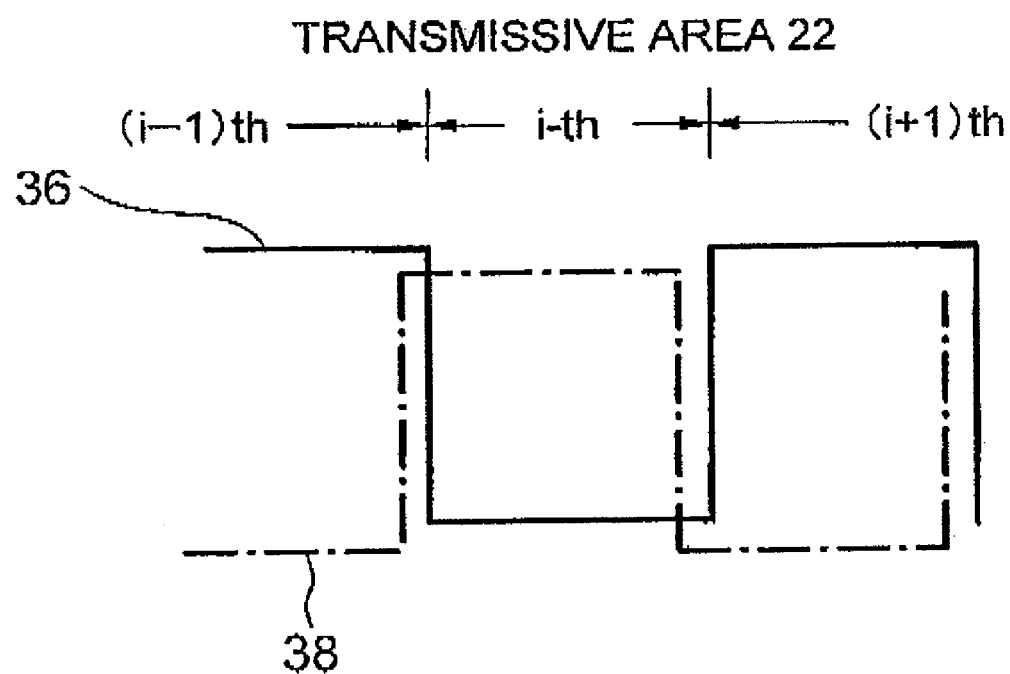
Figure 6A:
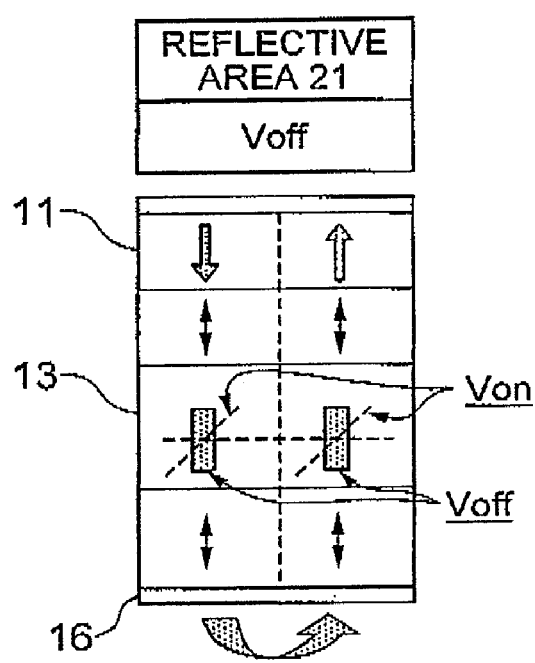
FIGS. 6A and 6B are diagrams showing polarization of light in the reflective area and transmissive area, respectively, upon application of the drive signals shown in FIGS. 5A and 5B, respectively.
Figure 6B:
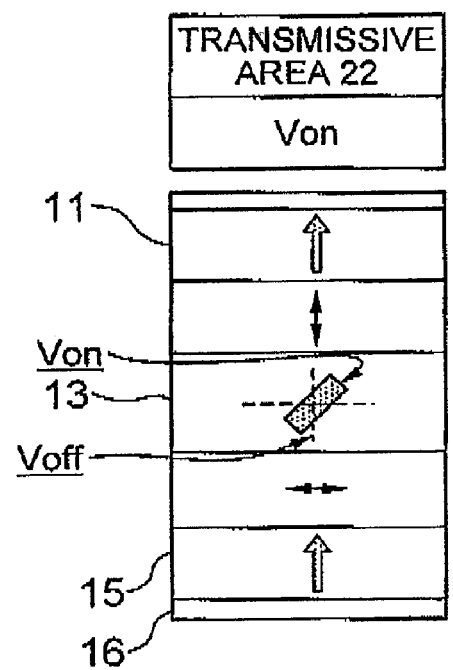

Now, description will be made with respect to a bright state or white state. FIG. 5A shows, similarly to FIG. 3A, a drive signal applied to the reflective area 21 at another operational stage. FIG. 5B also shows, similarly to FIG. 3B, a drive signal applied to the transmissive area 22 at the same operational stage. FIGS. 6A and 6B show polarization of light in the reflective area 21 and transmissive area 22, respectively, when the signals shown in FIGS. 5A and 5B are applied to both the areas. The signal of i-th fame shown in FIG. 5A does not apply a voltage between the pixel electrode 35 and the common electrode 37, whereby the orientation of LC molecules in the LC layer 13 in the reflective area 21 stays at 90 degrees. Thus, the 90-degree-linearly-polarized light passed by the first polarizing film 11 in the reflective area 21 is incident onto the LC layer 13 in the reflective area 21 at 0 degree relative to the orientation of the LC molecules in the LC layer 13, as shown in FIG. 6A. Thus, the polarization of the 90-degree-linearly-polarized light maintains the original polarization after passing through the LC layer 13. The 90-degree-linearly-polarized light is reflected by the reflection film 16, and then passed again by the LC layer 13, without any change of polarization thereof. Thus, the light passed by LC layer 13 is passed by the first polarizing film 11, whereby the reflective area 21 represents a bright state.

On the other hand, the drive signal shown in FIG. 5B applies a voltage to the transmissive area 22, and thus generates an electric field between the pixel electrode 36 and the common electrode 38 in the transmissive area 22, whereby the orientation of LC molecules in the LC layer 13 is rotated by about 45 degrees from the initial orientation. Thus, as shown in FIG. 6B, the 0-degree-linearly-polarized light passed by the second polarized film 15 is passed by the LC layer 13 to assume a 90-degree-linearly-polarized light due to the rotation of orientation of LC molecules by about 45 degrees. Thus, the linearly-polarized light is passed by the first polarizing film 11 to allow the transmissive area 22 to represent a bright state as well.

In short, the drive signals shown in FIGS. 5A and 5B allow both the reflective area 21 and transmissive area 22 to represent the same bright state. It is to be noted that if the voltage that allows the reflective area 21 to represent the dark state is not identical to the voltage that allows the transmissive area 22 to represent the bright state, a configuration may be employed wherein asymmetric common-electrode voltages are applied to the common electrode 37 and common electrode 38, and/or arrangement of the comb-teeth electrodes is adjusted, for obtaining the substantially same voltage-transmittance characteristic (V-T characteristic) and the substantially same voltage-reflectance characteristic (V-R characteristic) for the reflective area 21 and transmissive area 22.

In the typical TN-mode or ECB-mode LCD unit, a common λ/4 retardation film is provided for the reflective area and the transmissive area between each of the polarizing films and the substrate. In addition, the reflection film is configured by a reflection pixel electrode, the reflection pixel electrode in the reflective area is connected to the pixel electrode in the transmissive area, and a common pixel signal depending on the gray-scale level to be displayed is applied to both the pixel electrodes. The reflective area and transmissive area are driven by the same drive voltage. In this case, the LC molecules in both the reflective area and transmissive area are rotated to rise from the substrate surface during display of a dark state. This allows the retardation And of the LC layer in both the reflective area and transmissive area are represented by Δnd=0, and the polarized light is not affected by the LC layer upon passing through the LC layer. Thus, the boundary between the reflective area and the transmissive area is free from the leakage light.

On the other hand, the polarized light passing through the boundary area between the transmissive area and the reflective area is affected by employment of the retardation film only in the reflective area 21 or the drive scheme using drive signals having the inverted ON-OFF relationship wherein the transmissive area 22 and reflective area 21 are driven in the normally black mode and normally white mode, respectively. That is, employment of such a retardation film or drive scheme provides different orientations to the transmissive area and reflective area, whereby polarization of the light passing through the boundary area, i.e., passing through the transmissive area and then reflective area, and vice versa, is deviated from the normal orientation of the LC layer that provides the black state, thereby causing a leakage light.

For solving the above problem, the present embodiment employs, as shown in FIG. 1, the first light shield film 41 provided on the counter substrate 12 in the boundary area between the reflective area 21 and the transmissive area 22. This configuration suppresses most part of the external light incident onto the reflective area 21 through the front screen of the LCD unit from being emitted through the transmissive area 22. However, the light emitted by the backlight unit and passing through the boundary area between the transmissive area 22 and the reflective area 21 is not effectively suppressed because the material used for the first shield film has a specific reflectance. More specifically, the backlight reflected by the first shield film 41 in the boundary area enters the reflective area 21, and reflected by the reflection film 16 arranged in the reflective area 21. If the reflective area 21 operates in a normally black mode, this light reflected by the reflection film 16 stays at the linearly-polarized light, and thus absorbed by the first polarizing film 11 without causing any problem. However, since the reflective area 21 in the present embodiment operates in a normally white mode, the light turns into a circularly-polarized light after the reflection, and causes a leakage light.

For suppressing the above leakage light, the present embodiment employs the second shield film 42 provided on the TFT substrate 14 in the boundary area between the transmissive area 22 and the reflective area 21. This configuration suppresses the leakage light which passes both the transmissive area 22 and reflective area 21 while passing the boundary therebetween. The second shield film 42 may be substituted by a gate signal line 31, common-electrode line 29, 30, or data signal line 32, or a reflection film 16 provided in the reflective area 21. The second shield film 42 may be substituted by a pile of two or more of those interconnection lines. In such a case, if the reflective area 21 includes an interconnection line or reflection film overlying the interconnection line formed in the transmissive area 22, the combination of those interconnection lines or reflection film can suppress the leakage light even if those interconnection lines or reflection film have no overlapping part or pile therebetween.

Figure 7A:
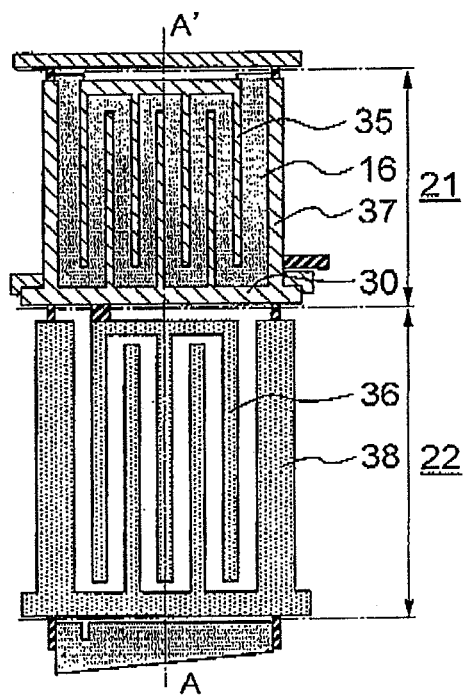
FIGS. 7A to 7C are a top plan view of the topmost layer, a top plan view of the intermediate film and a sectional view, respectively, showing the TFT substrate in a LCD unit of the comparative example wherein the second shield film is not provided.
Figure 7B:
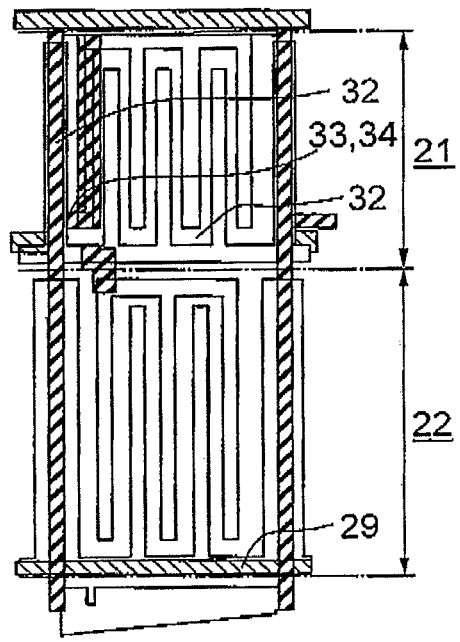
Figure 7C:
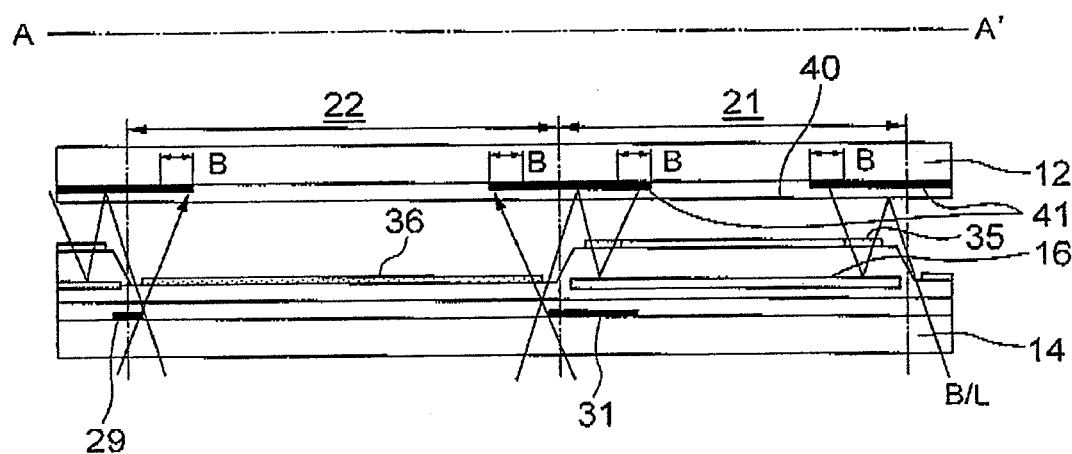

FIGS. 7A, 7B and 7C show a top plan view of the topmost film, a top plan view of an intermediate film and a sectional view of those films in a LCD unit of a comparative example, such as described in Patent Publication-4 and -5. In this comparative example, a shield film (shield film 41) is provided on the counter substrate 12, and another shield film (gate signal line 31) is provided on the TFT substrate 14 only in a small area in which the orientation of LC molecules is disturbed by a step difference formed between the reflective area 21 and the transmissive area 22. As depicted in FIG. 7C, the backlight (denoted by B/L in the figure) passing through the boundary area between the reflective area 21 and the transmissive area 22 causes a leakage light due to the orientation of the LC molecules, which is changed from the normal orientation providing a dark state by the electric field occurring in the boundary area. Numeral 30 in FIG. 7A denotes a second common-electrode line, and numeral 29 in FIG. 713 denotes a first common-electrode line 29.

In the comparative example shown in FIGS. 7A to 7C, wherein the shield film configured by the gate signal line 31 formed on the TFT substrate 14 is provided only in the area of step difference, the width of the first shield film 41 formed on the counter substrate 12 should be increased by the dimension denoted by "B" in FIG. 7C, because the leakage light caused by the backlight is enlarged on the surface of the counter substrate 12. Assuming that the light is incident in a slanted direction of 45 degrees with respect to the substrate surface in the comparative example, the calculated increased dimension "B" that is sufficient to prevent the leakage light in the front direction is around 5 μm, assuming that the refractive index of air is 1.0, and the refractive index within the LCD unit is 1.5. In consideration that each pixel includes two first shield films 41, the dimension "B" by which the first shield film 41 is to be increased is 5×4×1 μm. This calculation may be insufficient in view that the incident angle may be above 45 degrees as assumed above, and thus the increased dimension "B" may be larger. If the second shield film, which is configured by a metallic gate signal line 31 and provided in the transmissive area 22, is determined to have a larger width instead of provision of the first shield film 41 on the counter substrate 12 in the comparative example, the second shield film 31 may reflect the light upon display of a dark state and thus degrades the image quality as well.

Figure 8B:
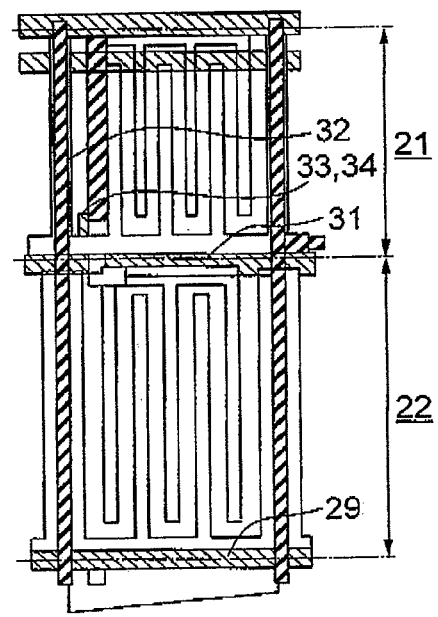
Figure 8C:
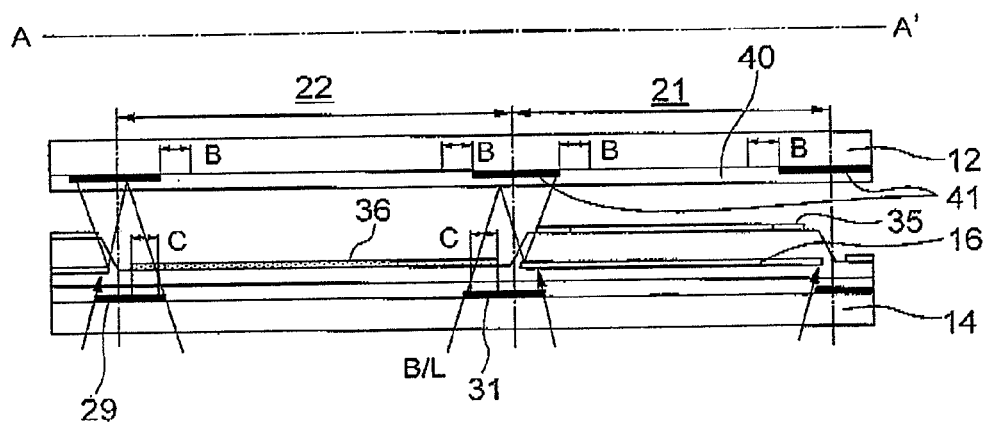
Figure 9A:
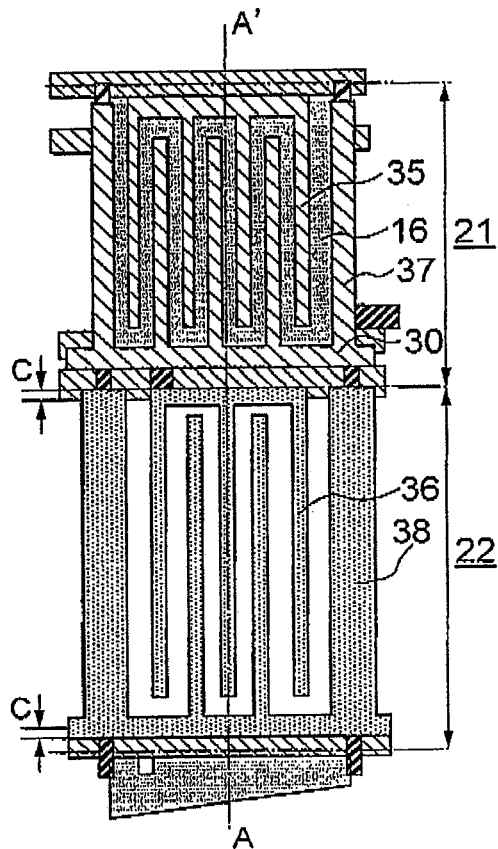
FIGS. 9A to 9C are a top plan view of the topmost layer, a top plan view of the intermediate film and a sectional view taken along line A-A' in FIG. 9A, respectively, showing the TFT substrate in the LCD unit of another modification of the first exemplary embodiment wherein the second shield film is configured by the second common electrode line.
Figure 9B:
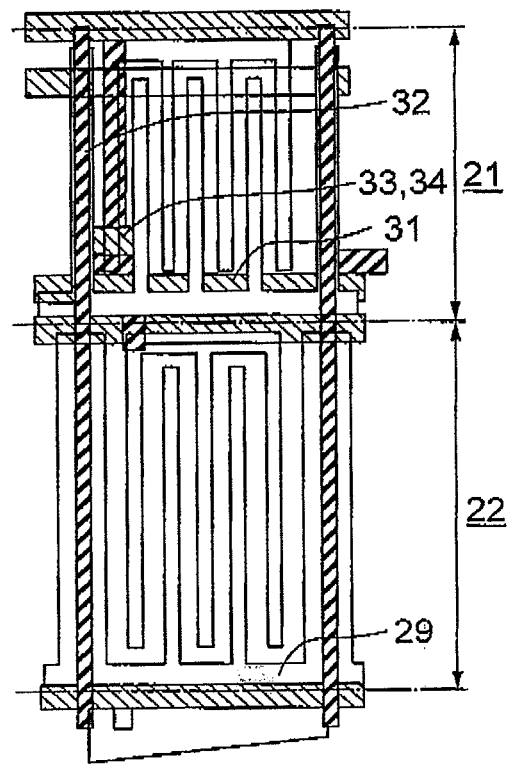
Figure 9C:
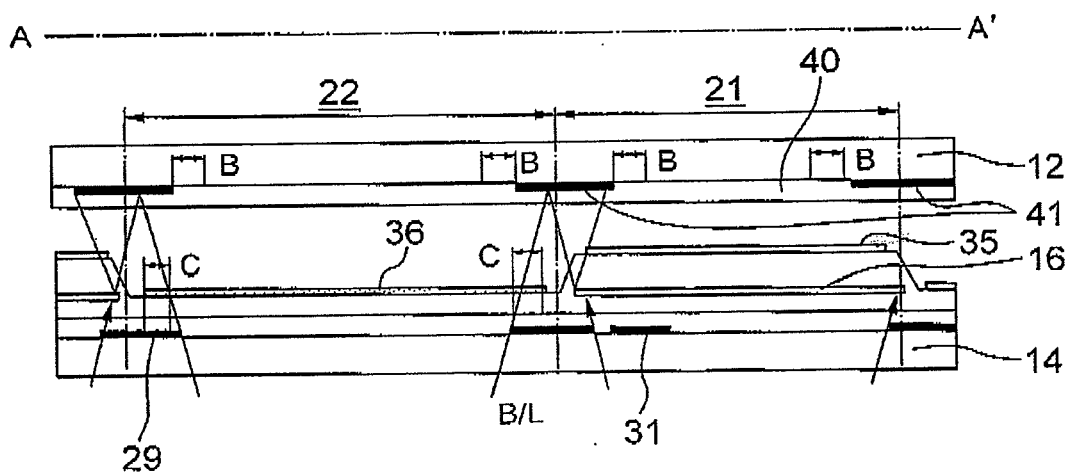
Figure 10A:
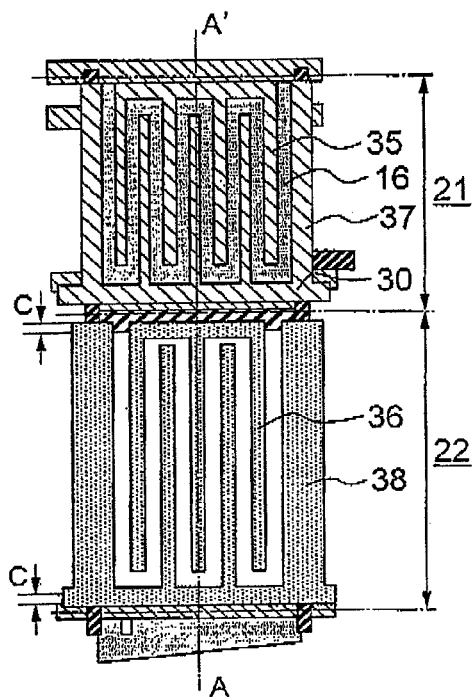
FIGS. 10A to 10C are a top plan view of the topmost layer, a top plan view of the intermediate film and a sectional view taken along line A-A' in FIG. 10A, respectively, showing the TFT substrate in the LCD unit of another modification of the first exemplary embodiment wherein the second shield film is configured by the drain line.
Figure 10B:
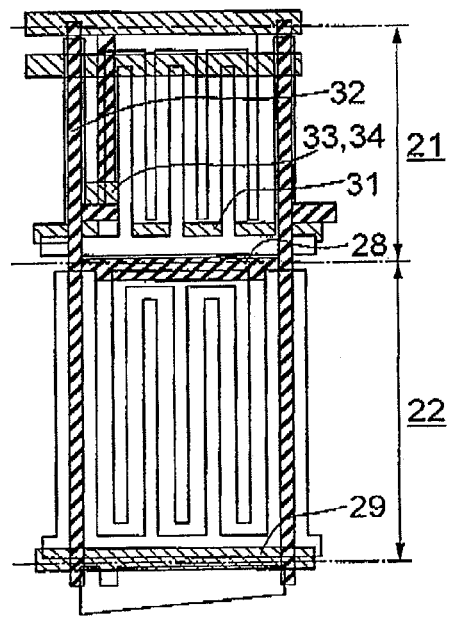
Figure 10C:
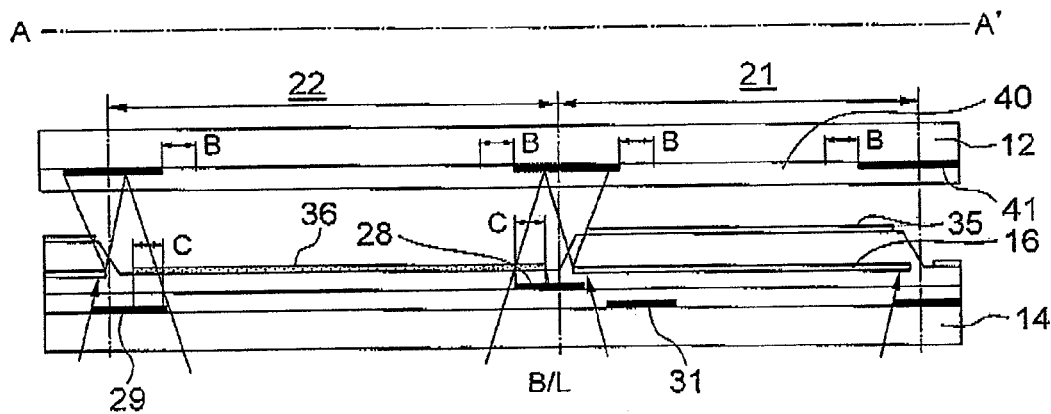

FIGS. 8A to 8C show, similarly to FIGS. 7A to 7C, a LCD unit 10 according to a modification of the first embodiment, wherein the second shield film 12 is configured by a pile of the gate signal line 31 and reflection film 16, FIGS. 9A to 9C show, similarly to FIGS. 7A to 7C, another modification of the first embodiment, wherein the second shield film 42 is configured by a pile of the first common-electrode line 29 and reflection film 16, and FIGS. 10A to 10C show, similarly to FIGS. 7A to 7C, another modification of the first embodiment, wherein the second shield film 42 is configured by a pile of the drain line 28 and reflection film 16. As depicted in these figures, the second shield film 42 formed as the versatile film intercepts the light passing through the area in which the orientation of LC layer is changed by the electric field occurring in the boundary area between the reflective area 21 and the transmissive area 22, whereby the dimension "B" for increasing the first shield film 41 can be reduced from the comparative example while achieving the advantage of the first embodiment that reduces the leakage light. The reduction of the dimension "B" raises the effective opening ratio of both the reflective area and transmissive area in each pixel. The reduction of the dimension "B" of the first shield film 41 from the comparative example is 5×4 μm for each pixel.

Figure 11:
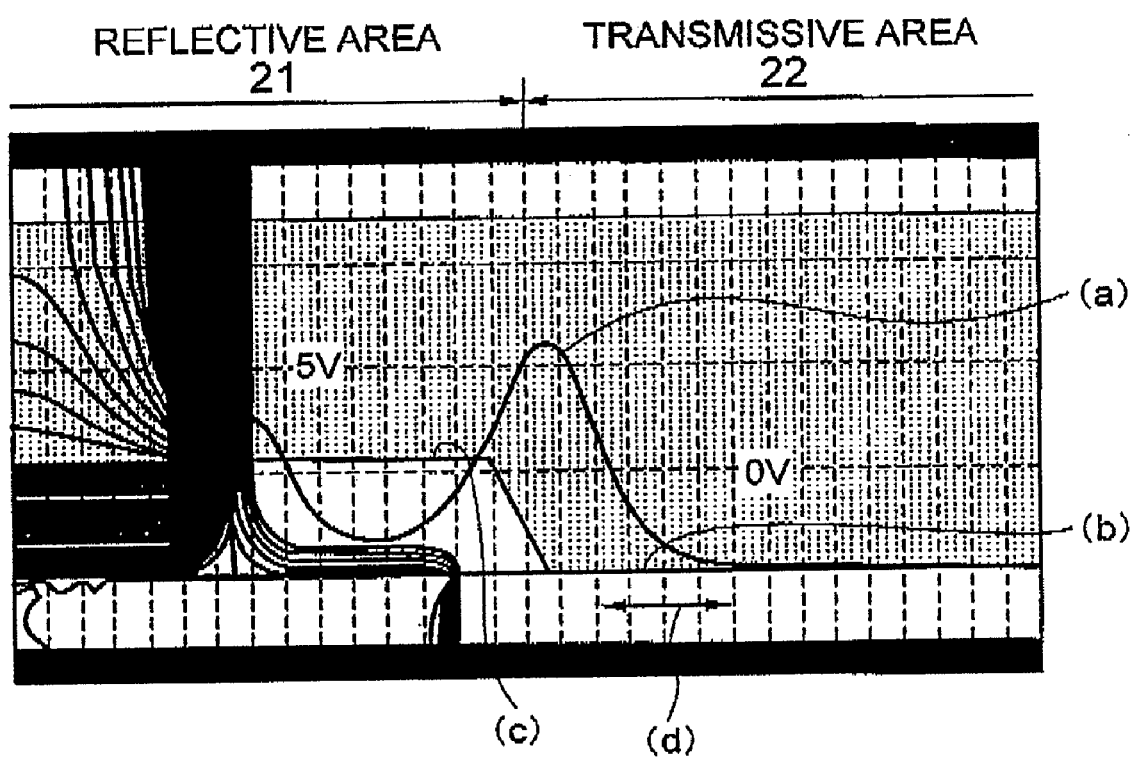
FIG. 11 is a diagram showing the result of simulation for the leakage light caused by change of orientation of LC molecules in another comparative example upon application of signals shown in FIGS. 3A and 3B, in the case where the shield film is not provided in the reflective area and transmissive area.

FIG. 11 shows the result of simulation performed for calculating the leakage light assuming that all the area of TFT substrate 14 including the area of the metallic film is allowed to pass therethrough the light in the state where the LC layer has an orientation of displaying a dark state during an inverted ON-OFF drive of the reflective area 21 and transmissive area 22. In FIG. 11, graph (a) shows the leakage light occurring due to driving the orientation of LC molecules by using the inverted ON-OFF drive scheme, graph (b) shows the leakage light caused by the pixel electrode 36 or common electrode 38, graph (c) shows the leakage light caused by the pixel electrode 35 or common electrode 37, and the double-pointed arrow denoted by (d) shows the location where the leakage light appears in the transmissive area.

The location of the double-pointed arrow (d) is in the vicinity of the edge of the pixel electrode 36 or common electrode 38 in the transmissive area 22, which is not applied a voltage upon display of the dark state. Since the distance between adjacent vertical dotted lines in FIG. 11 corresponds to a dimension of 1 micrometer, it is understood that an edge potion of a 4-micrometer width in the transmissive area 22 in the vicinity of the reflective area 21 is involved with the leakage light due to disturbance of the orientation of LC molecules caused by the electric field occurring in the boundary area 22. This reveals the fact that the leakage light caused by the disturbance of the LC molecules in the LC layer 13 generated due to the potential difference between both the areas 21, 22 can be cancelled by providing the second shield film 42 that shields the edge potion of the 4-micrometer width in the transmissive area 22.

Figure 12:
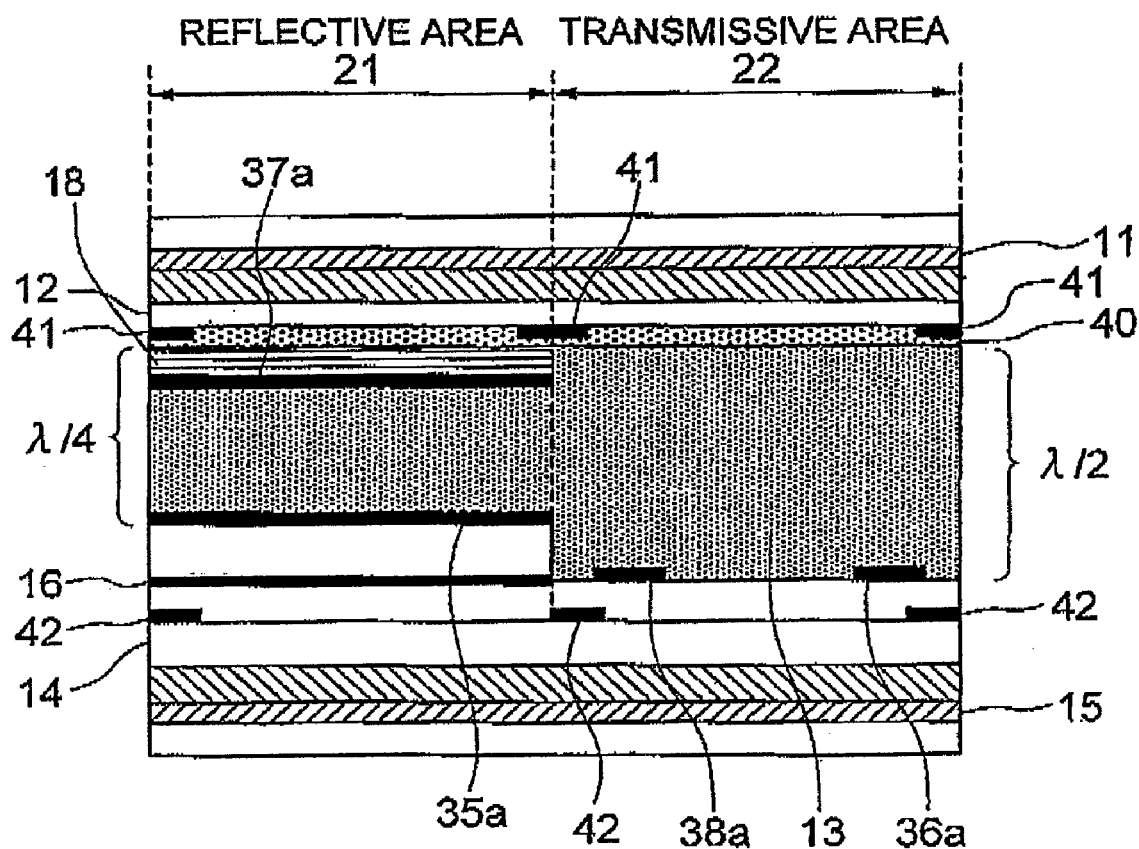
FIG. 12 is a sectional view of a LCD unit according a second exemplary embodiment of the present invention.

Hereinafter, a LCD unit according to a second exemplary embodiment of the present invention will be described. FIG. 12 shows the LCD unit of the present embodiment. The LCD unit 10a includes a first polarizing film 11, a counter substrate 12, a retardation film 18, a LC layer 13 having a homogeneously-oriented initial orientation, a TFT substrate 14, and a second polarizing film 15, which are arranged in this order as viewed from the front screen. The LCD unit 10a is configured as a transflective LCD unit that includes the reflective area 21 and the transmissive area 22 in each pixel. On the TFT substrate 14, there is provided a reflection film 16 disposed in the reflective area 21 between the second polarizing film 15 and the LC layer 13 for reflecting the external light incident from the first polarizing film 11. The reflection film 16 may be configured by any material so long as the reflection film 16 effectively reflects the light incident from the first polarizing film 11. The reflection film 16 may preferably have a convex-concave surface for improving the light scattering performance thereof.

The retardation film 18 is disposed in the reflective area 21 between the first polarizing film 11 and the LC layer 13. The retardation film 18 has a retardation of $\lambda/4$ for the light having a wavelength, $\lambda$, of 550 nm, and is arranged so that the optical axis thereof is at 45 degrees relative to the polarization of the linearly-polarized light incident from the first polarizing film 11. In an alternative, the retardation film 18 may have a retardation other than $\lambda/4$, so tong as the combination of the arrangement of optical axis and the retardation of the LC layer allows the incident light to assume a circularly-polarized light upon incidence onto the reflection film 16 when the LC layer is applied with the voltage for display of a dark state.

The common electrode 37a in the reflective area 21 may be disposed on the counter substrate 12, whereas the pixel electrode 35a in the reflective area 21, and the pixel electrode 36a and common electrode 38a in the transmissive area 22 may be disposed as the topmost layer of the TFT substrate 38a, with or without an overcoat insulation film covering the topmost electrode layer. If the pixel electrode 35a in the reflective area 21 is configured as the topmost layer of the TFT substrate 14, the pixel electrode 35a may be substituted by the reflection film 16 made of a metal. The external light incident from the counter substrate 12 is used as the display light source of the reflective area 21. A backlight unit (not shown) disposed at the rear side of the second polarizing film 15 is used as the display light source of the transmissive area.

The thickness of LC layer 13 in the transmissive area 22 should be determined so that the retardation of LC layer 13 calculated from the refractive index of the LC material is $\lambda/2$ for the light having a wavelength, $\lambda$, of 550 nm. However, the thickness is determined at $(\lambda/2)+\beta$ in fact. This is because the effective retardation of the LC layer 13 is determined at $\lambda/2$ in consideration that the rotation of LC molecules at the central portion of the cell gap is somewhat suppressed as compared to the LC molecules in the vicinity of the substrates, and this fact reduces the effective retardation from $(\lambda/2)+\beta$ down to $\lambda/2$. For example, by setting the retardation, $\Delta nd$, of the LC layer 13 at $\Delta nd=300$ nm, the effective retardation $\Delta nd(eff)$ thereof is 275 nm which is equal to $\Delta nd(eff)=\lambda/2=550$ nm/2.

For the transmissive area 22, the optical axis of the first polarizing film 11 is perpendicular to the optical axis of the second polarizing film 15, and is perpendicular or parallel to the direction of the orientation of the LC layer 13 upon display of a dark state. This arrangement allows the linearly-polarized light emitted from the backlight unit and passed by the second polarizing film 15 is passed by the LC layer 13 as it is, i.e., without a change of polarization, whereby the direction of polarization of the linearly-polarized light coincides with the absorption axis of the first polarizing film 11. Thus, by driving the transmissive area 22 and reflection area 21 by the same potential, the transmissive area 22 represents a dark state when the pixel electrode 36 and the common electrode 38 have a potential difference of 0 volt therebetween, or more precisely, a potential difference below the potential difference corresponding to the threshold electric field at which the LC molecules starts rotation from the initial orientation.

If the LC layer in the reflective area has a retardation, $\Delta nd$, of $\lambda/4$, similarly to the first embodiment, the light, which is once converted into a circularly-polarized light by the retardation film 18, is again converted into a linearly-polarized light by the LC layer 13, and reflected by the reflection film 16 as it is, to represent a white state, whereby there arises the problem that both the areas represent different images.

For solving the above problem in the present embodiment, drive voltages having the inverted ON-OFF relationship therebetween are applied to the reflective area 21 and transmissive area 22, thereby allowing both the areas to represent the same image. The counter substrate 12 is provided with a color filter layer 40 in each pixel, and a first shield film 41 in the boundary area, i.e., the boundary between adjacent pixels and between the reflective area 21 and the transmissive area 22 in each pixel and the vicinity of the boundary. The TFT substrate 14 is provided with a second shield film 42 in the boundary area between the reflective area 21 and the transmissive area 22. The second shield film 42 may be a separate film, or may be a versatile film which also acts as the common electrode line, data signal line, or gate signal line which are connected to the pixel electrodes 35a, 36a or common electrodes 37a, 38a. The second shield film 42 may be a versatile film which acts as the reflection film 16 in the reflective area 21. If either the pixel electrode 36a or common electrode 38a is a transparent electrode, the first shield film 41 and second shield film 42 may be disposed in the space between the edge of the reflection film 16 and a position which is 4 μm apart from the edge of the electrode in the direction away from the reflective area, the edge of the electrode being disposed adjacent to the reflective area 21. For example, these shield films may be arranged in the space "C" shown in FIG. 17C.

Hereinafter, operation of the LCD unit of the present embodiment will be described. Since operation of the transmissive area is similar to that of the LCD unit of the first embodiment, only operation of the reflective area will be described below.

Figure 13:
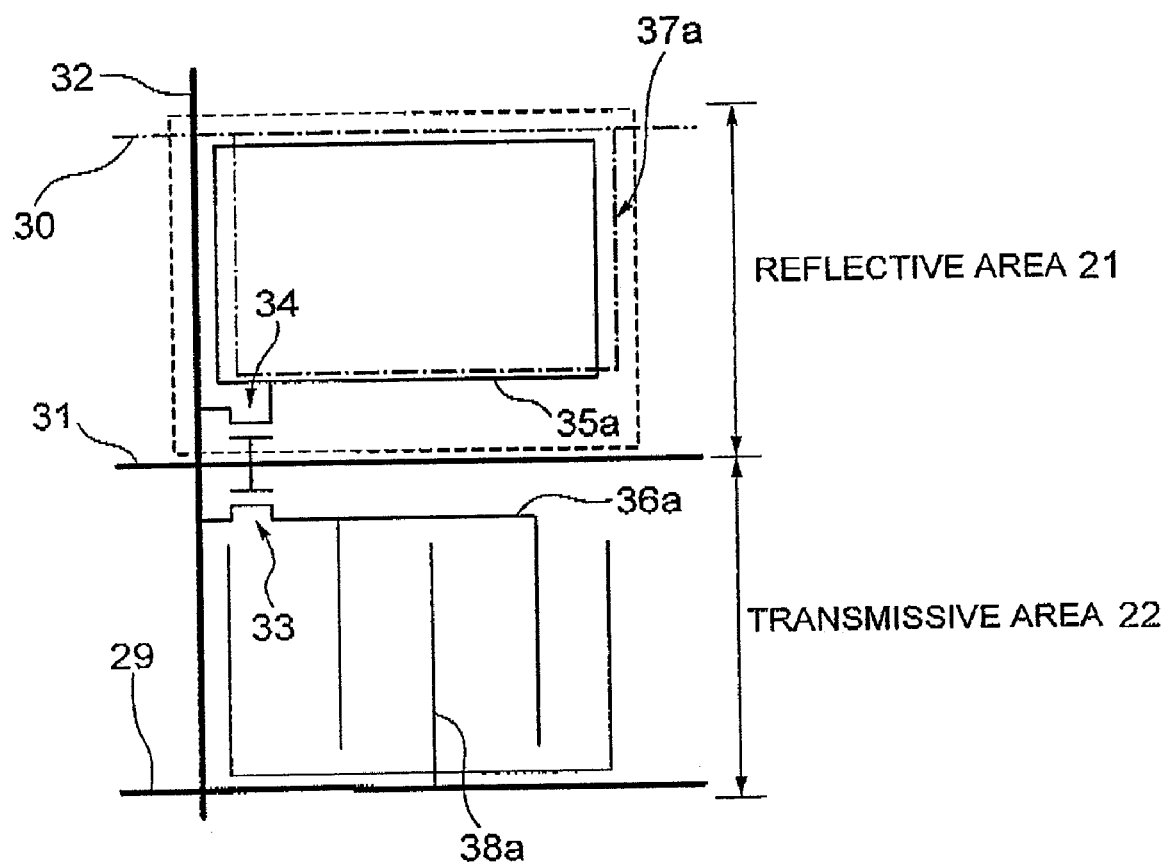
FIG. 13 is a top plan view of the LCD unit of the second exemplary embodiment.

FIG. 13 is a top plan view of the pixel for showing the TFTs, interconnection lines, pixel electrodes and common electrodes formed on the TFT substrate 14, and a common electrode formed on the counter substrate 12. On the TFT substrate 14, there are provided a gate signal line 31 and a data signal line 32 extending perpendicular to the gate signal line 31. In the vicinity of the intersection of the gate signal line 31 and data signal line 32, a pair of TFTs 33 and 34 are provided corresponding to the reflective area 21 and transmissive area 22, respectively The TFTs 33 and 34 each have a gate connected to the gate signal line 31, and source/drain regions connected between the data signal line 32 and the corresponding pixel electrode 35a or 36a. The common electrodes 37a and 38a are provided in the reflective area 21 and transmissive area 22, respectively. Common electrode 38a has a first portion extending parallel to the gate signal line 31 and a second portion protruding from the first portion into the display area of the transmissive area 22. Common electrode 37a is disposed on the counter substrate 12. The common electrodes 37a and 38a are each applied with a common-electrode signal that is common to the pixels of the LCD unit and has a specific waveform. In the reflective area 21, the LC layer 13 is controlled by an electric field corresponding to the potential difference between the pixel electrode 35a and the first common electrode 37a.

In the transmissive area 22, orientation of the LC layer 13 is controlled by the electric field corresponding to the potential difference between the pixel electrode 36a and the common electrode 38a. Here, the pixel electrode 35a in the reflective area 21 and the pixel electrode 36a in the transmissive area 22 are connected to respective TFTs 33 and 34, which are connected to the same gate signal line 31 and the same data signal line 32. This configuration allows the orientation of LC layer 13 in the reflective area 21 to be controlled by the electric field generated between the pixel electrode 35a and the common electrode 37a when the TFTs 33 and 34 are turned ON.

On the other hand, in the transmissive area 22, the orientation of LC layer 13 is controlled by the electric field corresponding to the potential difference between the pixel electrode 36a and the common electrode 38a. Although the same drive signal is applied to the reflective area 21 and the transmissive area 22, separate TFTs 33, 34 are provided to the reflective area 21 and the transmissive area 22. This is because the potential fluctuation of the pixel electrode 36 in the transmissive area 22 and the pixel electrode 35 in the reflective area is different therebetween, after the TFTs 33, 34 that applied the same drive signal are turned OFF. In the above description, TFTs 33, 34 are connected to the same gate signal line and the same data signal lines; however, these TFTs may be connected to different gate signal lines and/or different data signal lines.

The drive signals are input to the LCD unit similarly to the LCD unit of the first embodiment. FIG. 3A shows a drive signal waveform of the reflective area 21 at an operational stage, whereas FIG. 3B shows a drive signal waveform of the transmissive area 22 at the same operational stage. The common-electrode signal is inverted between frames and between rows in the case of a gate-line inversion drive scheme. FIGS. 3A and 3B show this situation wherein the common electrodes 37, 38 are driven by respective common-electrode signals which have an inverted relationship therebetween and are inverted between frames to alternately assume 0 volt and 5 volt, for example. Since the TFTs 33, 34 are connected to the same data signal line, the pixel signal applied to the pixel electrode 35a is the same as the pixel signal applied to the pixel electrode 36a. As understood from FIG. 3A, a 0-volt data signal is applied to the pixel electrode 35a and a 5-volt data signal is applied to the electrode 37a in the i-th frame, whereby the potential difference therebetween is at the maximum, 5 volt, which drives the LC layer 13 in the reflective area 21. In the same i-th frame, a 0-volt signal is applied to the common electrode 38, whereby the potential difference between the pixel electrode 36 and the common electrode 38 is 0 volt, and thus the LC layer 13 in the transmissive area 22 is not driven.

Figure 14A:
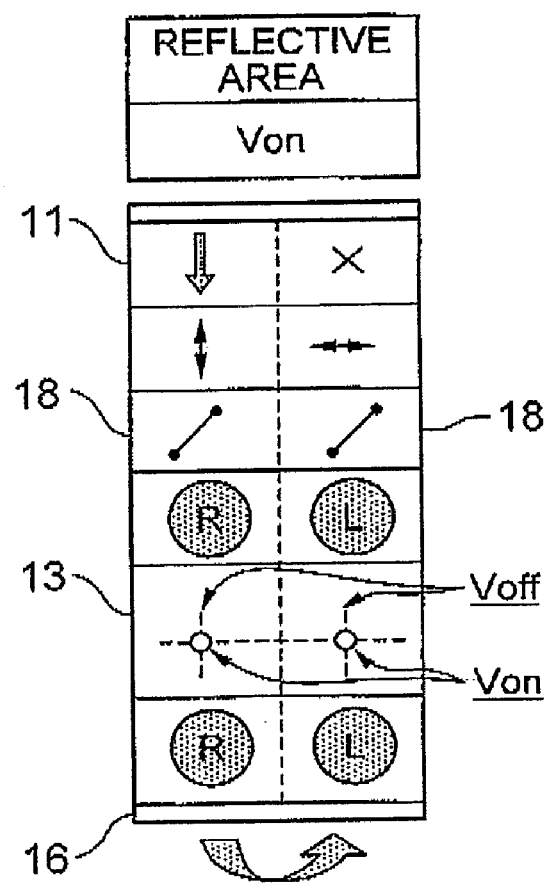
FIGS. 14A and 14B are diagrams showing polarization of light in the reflective area and transmissive area, respectively, in the LCD unit of the second exemplary embodiment upon application of the drive signals shown in FIGS. 3A and 3B, respectively.
Figure 14B:
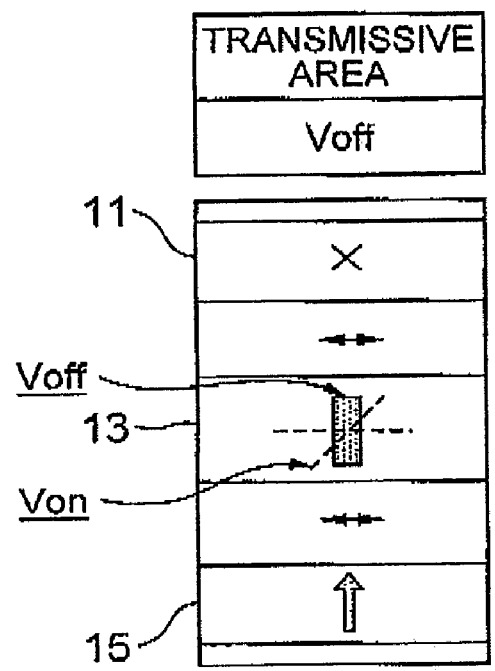

FIGS. 14A and 14B, similarly to FIGS. 4A and 4B, show polarization of light in the reflective area 21 and transmissive area 22, respectively, when the signals of i-th fame shown in FIGS. 3A and 3B are applied to those areas. In FIG. 14A, the direction of retardation of the λ/4 retardation film 18 is shown by a double-dotted line. The arrangement of the pixel electrode 35a and common electrode 37a is determined such that the signal shown in FIG. 3A allows the orientation of the LC molecules in the LC layer 13 in the reflective area 21 to rise at 90 degrees away from the substrate surface. In the reflective area 21, as shown in FIG. 4A, the external light having a 90-degree-linearly-polarized state and passed by the first polarizing film 11 is incident onto the retardation film 18 having an optical axis disposed at 45 degrees relative to the polarization of the incident light. Since the retardation film 18 has a retardation of λ/4, the light passed by the retardation film 18 is incident onto the LC layer 13 as a clockwise-circularly-polarized light. Since the orientation of LC molecules in the LC layer 13 in the reflective area 21 is perpendicular to the substrate surface, the retardation, Δnd, of the LC layer 13 in the reflective area 21 is about 0 nm, whereby the incident light is passed by the LC layer 13 as it is, i.e., as the clockwise-circularly-polarized light. This clockwise-linearly-polarized light is reflected by the reflection film 16 to assume a counterclockwise-circularly-polarized light, which is again passed by the LC layer 13 and retardation film 18 to assume a linearly-polarized light having a polarization direction that is 90 degrees rotated from the original polarization upon incidence onto the retardation film 18. Thus, the polarized light has a polarization parallel to the absorption axis of the first polarizing film 11. Accordingly, the light reflected by the reflection film 16 cannot pass through the first polarizing film 11, whereby the reflective area 21 represents a dark state.

On the other hand, the signal of i-th frame shown in FIG. 3B cannot generate an electric field in the transmissive area 22 between the pixel-electrode 36a and the common electrode 38a, whereby orientation of the LC molecules in the LC layer 13 stays at 90 degrees. Thus, the 0-degree-linearly-polarized light passed by the second polarizing film 15 passes through the LC layer 13 as it is, i.e., without a change of the polarization thereof, to be incident onto the first polarizing film 11. Therefore, the light incident onto the first polarizing film 11 through the LC layer 13 cannot pass through the first polarizing film 11, whereby the transmissive area 22 also represents a dark state.

As described heretofore, the common-electrode signals applied to the common electrodes 37 and 38 and having an inverted relationship therebetween provides drive signals having an inverted ON-OFF relationship therebetween, which allows the same pixel signal applied to the pixel electrodes 35 and 36 to rotate only the orientation of LC layer 13 in the reflective area 21. This allows the transmissive area 22 to represent a dark state when the reflective area 21 represents a dark state while applying the same data signal to both the reflective area 21 and transmissive area 22. That is, both the areas can represent the same image without applying different data signals to the reflective area 21 and transmissive area 21.

Figure 15A:
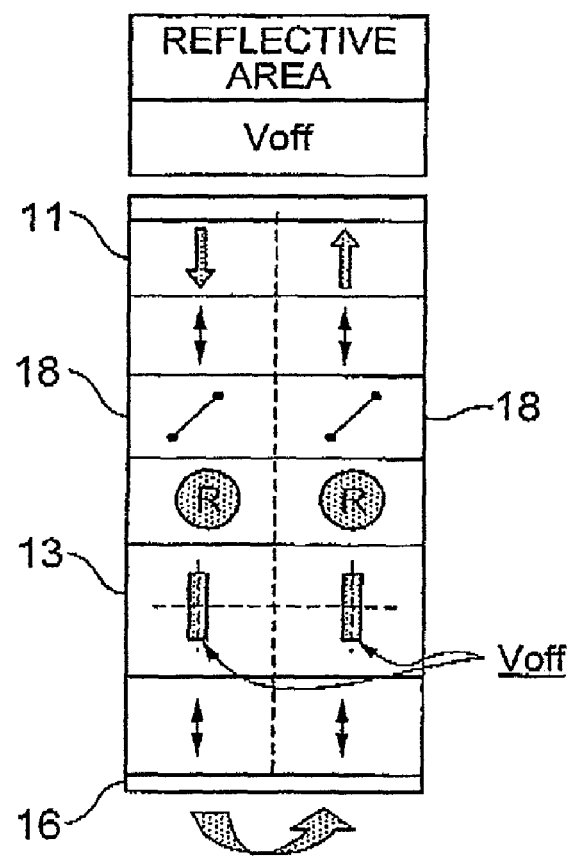
FIGS. 15A and 15B are diagrams showing polarization of light in the reflective area and transmissive area, respectively, in the second exemplary embodiment upon application of the drive signals shown in FIGS. 5A and 5B, respectively.
Figure 15B:
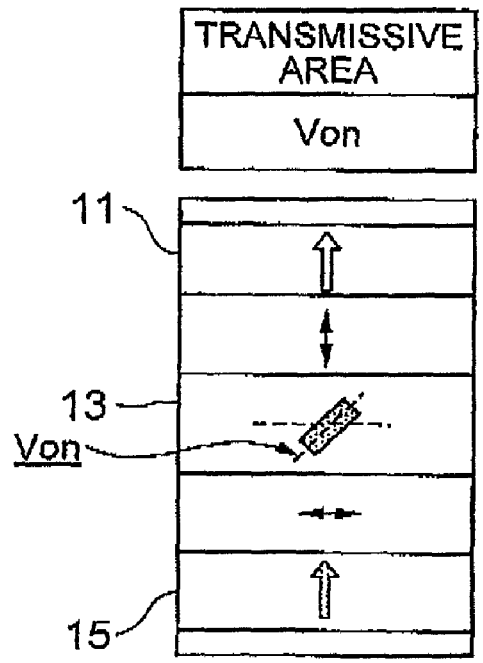

The drive signals are input to the LCD unit similarly to the LCD unit of the first exemplary embodiment. FIG. 5A shows, similarly to FIG. 3A, a drive signal applied to the reflective area 21 at another operational stage. FIG. 5B also shows, similarly to FIG. 3B, a drive signal applied to the transmissive area 22 at the same operational stage. FIGS. 15A and 15B show polarization of light in the reflective area 21 and transmissive area 22, respectively, when the signals of i-th frame shown in FIGS. 5A and 5B are applied to both the areas. The signal of i-th shown in FIG. 5A does not apply a voltage between the pixel electrode 35a and the common electrode 37a, whereby the orientation of LC molecules in the LC layer 13 in the reflective area 21 stays at 90 degrees. Thus, the 90-degree-linearly-polarized light passed by the first polarizing film 11 in the reflective area 21 is incident onto the LC layer 13 in the reflective area 21 at 0 degree relative to the orientation of the LC molecules in the LC layer 13, as shown in FIG. 15A. Thus, the polarization of the 90-degree-linearly-polarized light maintains the original polarization after passing through the LC layer 13. The 90-degree-linearly-polarized light is reflected by the reflection film 16, and then passed again by the LC layer 13 without any change of polarization thereof in the return optical path. Since the first polarizing film 11 has an optical transmission axis of 90 degrees, the first polarizing film 11 passes therethrough the incident light, whereby the reflective area 21 represents a white state.

On the other hand, the drive signal of i-th frame shown in FIG. 5B applies a voltage to the transmissive area 22, and thus generates an electric field between the pixel electrode 36a and the common electrode 38a in the transmissive area 22, whereby the orientation of LC molecules in the LC layer 13 is rotated by about 45 degrees from the initial orientation. Thus, as shown in FIG. 15B, the 0-degree-linearly-polarized light passed by the second polarized film 15 is passed by the LC layer 13 to assume a 90-degree-linearly-polarized light due to the rotation of orientation of LC molecules by about 45 degrees. Thus, the linearly-polarized light is passed by the first polarizing film 11 to allow the transmissive area 22 to represent a white state as well.

In short, the drive signals shown in FIGS. 5A and 5B allow both the reflective area 21 and transmissive area 22 to represent the same bright state. It is to be noted that if the voltage that allows the reflective area 21 to represent the dark state is not identical to the voltage that allows the transmissive area 22 to represent the bright state, a configuration may be employed wherein asymmetric common voltages are applied to the common electrode 37 and common electrode 38, and/or arrangement of the comb-teeth electrodes is adjusted, for obtaining the substantially same V-T characteristic and the substantially same V-R characteristic for the reflective area 21 and transmissive area 22.

Figure 16A:
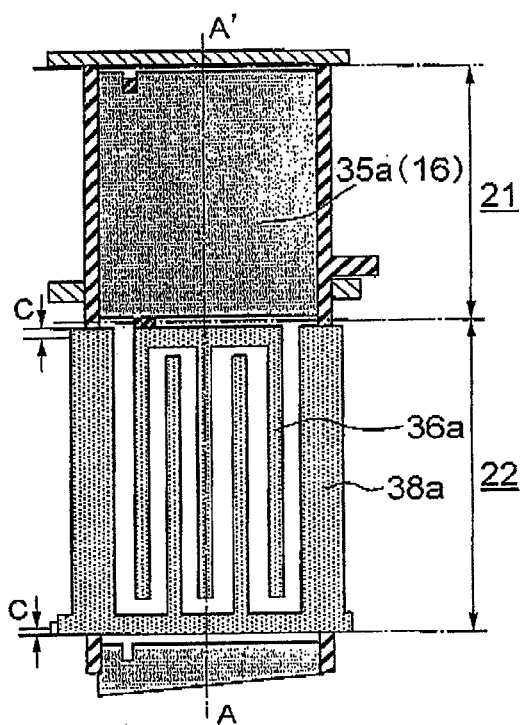
FIGS. 16A to 16C are a top plan view of the topmost layer, a top plan view of the intermediate film and a sectional view taken along line A-A' in FIG. 16A, respectively, showing the TFT substrate in the LCD unit of another comparative example wherein the second shield film is not provided.
Figure 16B:
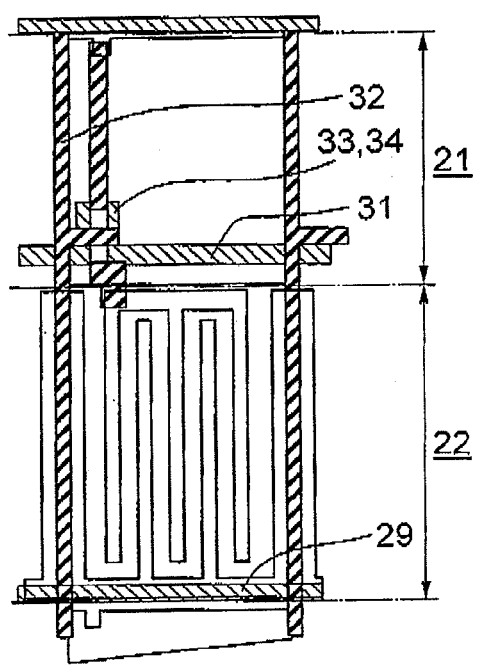
Figure 16C:
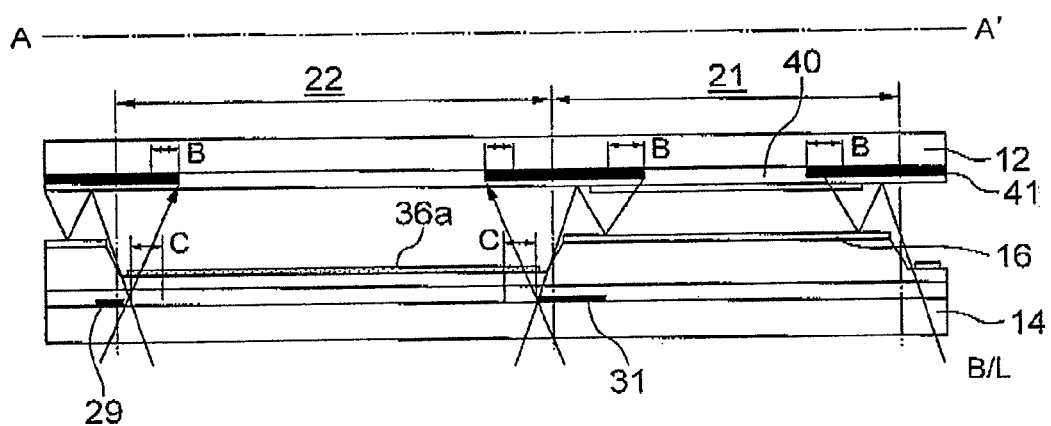

FIGS. 16A, to 16C show, similarly to FIGS. 7A to 7C, a top plan view of the topmost film, a top plan view of an intermediate film and a sectional view of those films formed on the TFT substrate 14 in a LCD unit of another comparative example, wherein the first shield film 41 formed on the counter substrate 41 and another shield film (configured by the gate signal line 31) formed on the TFT substrate 14 are provided only in the area in which the orientation of LC molecules is disturbed by a step difference formed between the reflective area 21 and the transmissive area 22, similarly to the LCD unit described in Patent Publication-4 and -5. As depicted in FIG. 16C, the backlight B/L passing through the boundary area between the reflective area 21 and the transmissive area 22 causes a leakage light due to the orientation of the LC molecules, which is changed from the normal orientation providing a dark state by the electric field occurring in the boundary area. In the comparative example shown in FIGS. 16A to 16C, wherein the shield film 41 formed on the TFT substrate 14 is provided only in the small area of step difference, the width of the first shield film 41 formed on the counter substrate 12 should be increased by the dimension denoted by "B" in FIG. 16C.

Assuming that the light is incident in a slanted direction of 45 degrees with respect to the substrate surface in the comparative example, the calculated increased dimension of "B" that is sufficient to prevent the leakage light in the front direction is around 5 µm, assuming that the refractive index of air is 1.0, and the refractive index within the LCD unit is 1.5.

In consideration that each pixel includes two first shield films 41, the dimension "B" by which the first shield film 41 is to be increased is 5×4×1 µm. This calculation may be insufficient in view that the incident angle may be above 45 degrees as assumed above, and thus the dimension "B" may be larger. If the first shield film 41 is not provided, the second shield film, which is configured by a metallic gate signal line 31 and provided in the transmissive area 22, may reflect the light upon display of a dark state and thus degrade the image quality.

Figure 17A:
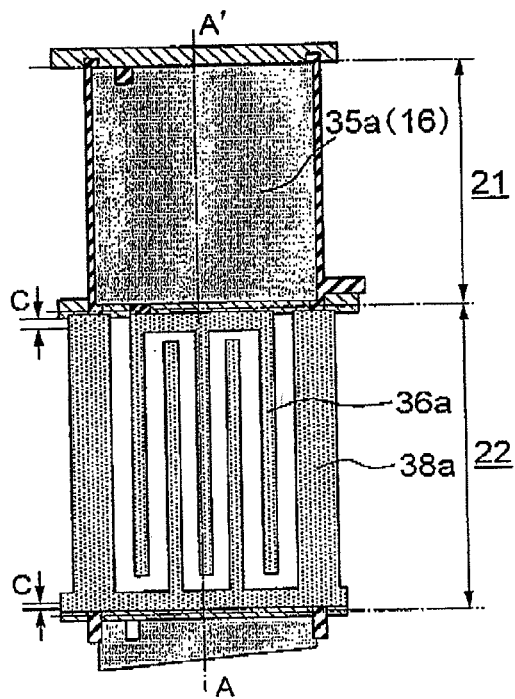
FIGS. 17A to 17C are a top plan view of the topmost layer, a top plan view of the intermediate film and a sectional view taken along line A-A' in FIG. 17A, respectively, showing the TFT substrate in a LCD unit of a modification from the second exemplary embodiment wherein the second shield film is configured by the second common electrode line.
Figure 17B:
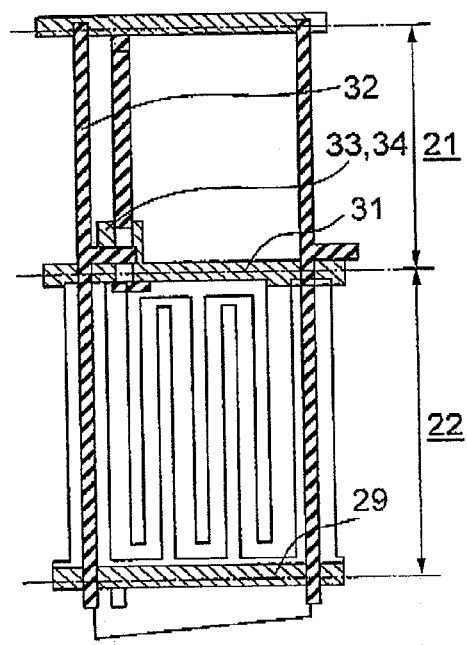
Figure 17C:
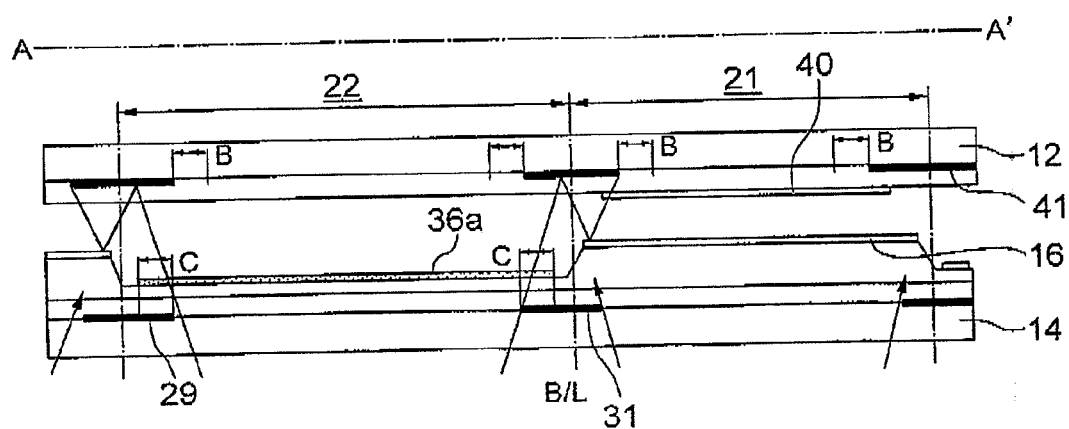
Figure 18A:
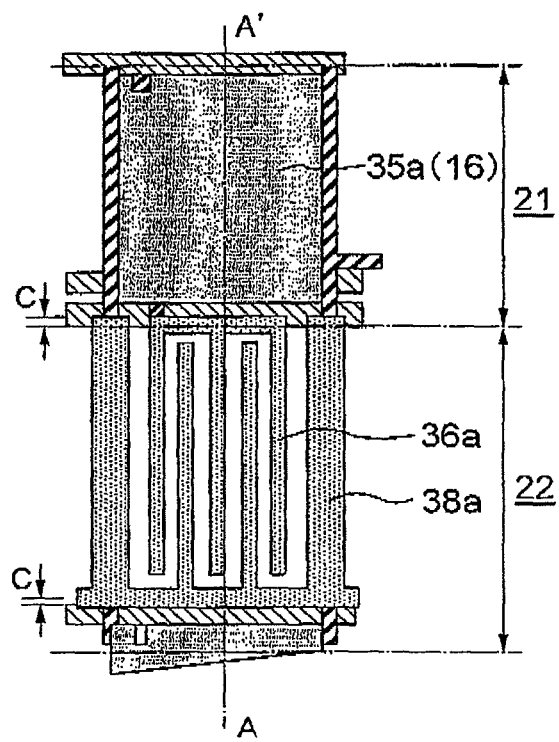
FIGS. 18A to 18C are a top plan view of the topmost layer, a top plan view of the intermediate film and a sectional view taken along line A-A' in FIG. 18A, respectively, showing the TFT substrate in the LCD unit of another modification of the second exemplary embodiment wherein the second shield film is configured by the second common electrode line.
Figure 18B:
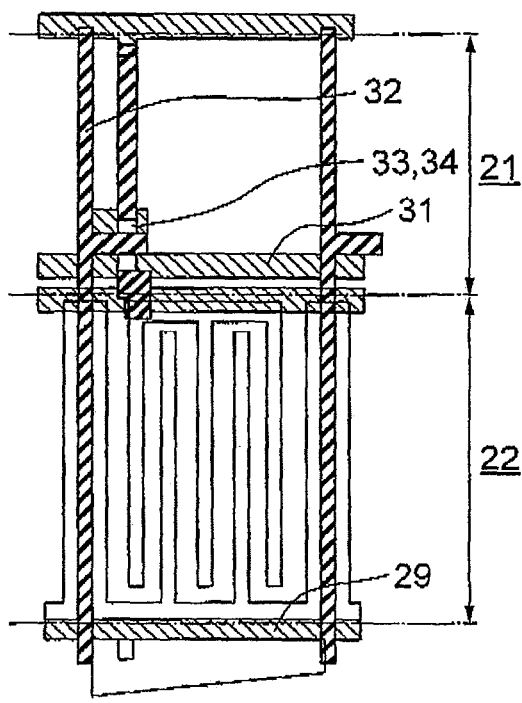
Figure 18C:
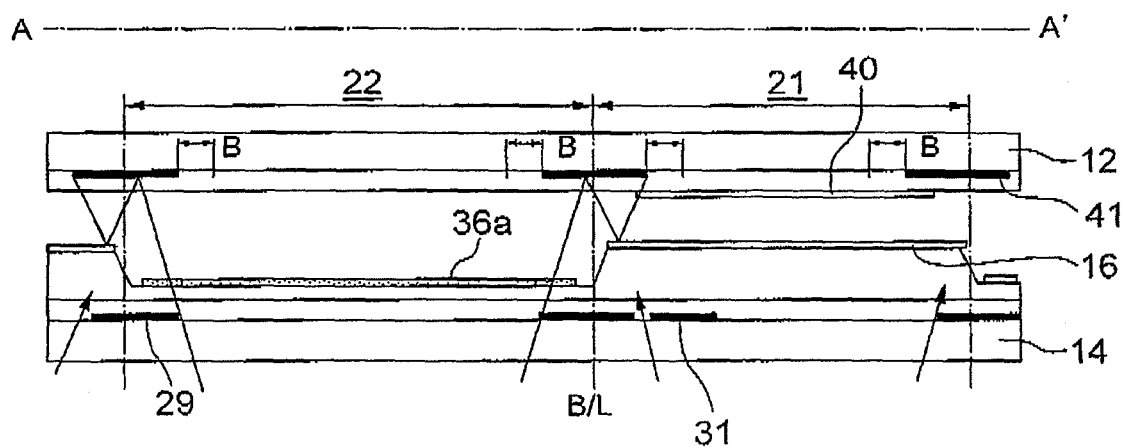
Figure 19A:
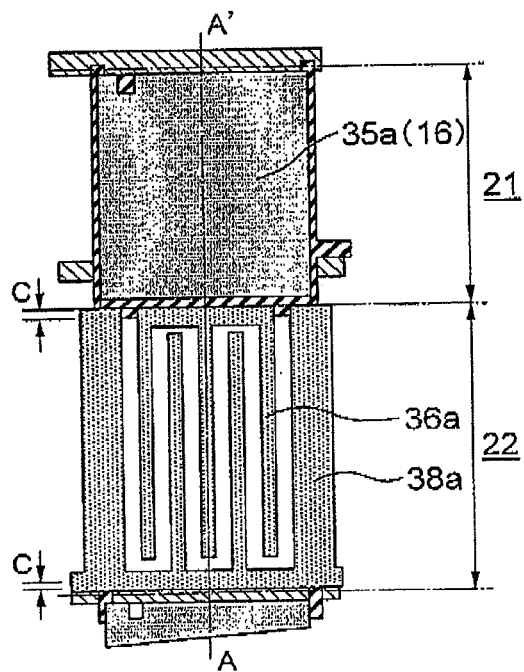
FIGS. 19A to 19C are a top plan view of the topmost layer, a top plan view of the intermediate film and a sectional view taken along line A-A' in FIG. 19A, respectively, showing the TFT substrate in the LCD unit of another modification of the second exemplary embodiment wherein the second shield film is configured by the drain line.
Figure 19B:
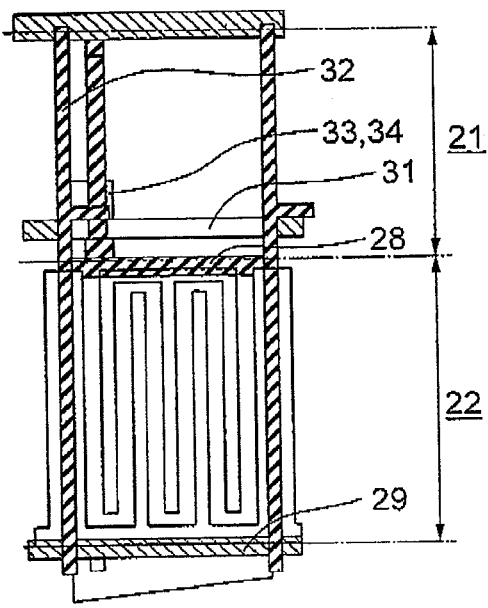
Figure 19C:
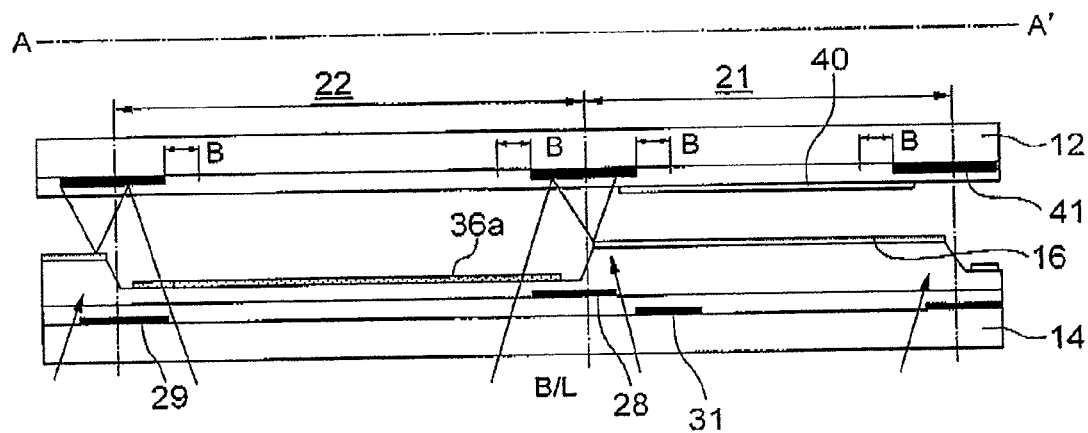

FIGS. 17A to 17C show, similarly to FIGS. 7A to 7C, a LCD unit of a modification from the second embodiment, wherein the second shield film is configured by a pile of the gate signal line 31 and reflection film 16, FIGS. 18A to 18C show, similarly to FIGS. 7A to 7C, another modification from the second embodiment, wherein the second shield film is configured by a pile of the first common-electrode line 29 and reflection film 16, and FIGS. 19A to 19C show, similarly to FIGS. 7A to 7C, another modification of the second embodiment, wherein the second shield film 42 is configured by a pile of the drain line 28 and reflection film 16. The drain line 28 connects together the TFT 33, 34 and the pixel electrode 35a, 36a, and may be referred to as a data signal line as well in this text. As depicted in these figures, the second shield film formed as the versatile film intercepts the light passing through the area in which the orientation of LC layer 13 is changed by the electric field occurring in the boundary area between the reflective area 21 and the transmissive area 22, whereby the leakage light can be reduced without lowering the effective opening ratio of both the reflective area 21 and transmissive area 22. The improvement of the effective opening ratio may be about a product of 20 µm (length) and width (sum of "Bs") for each pixel as compared to the structure of FIGS. 16A to 16C.

The present invention can be applied to a LCD unit mounted on versatile terminal units, such as a cellular phone, digital camera, television set, and PDA (portable data assistant).

The invention claimed is:

1. A liquid crystal display (LCD) unit comprising:
    a liquid crystal (LC) cell including a LC layer and first and second substrates sandwiching therebetween said LC layer, said LC cell defining an array of pixels each including a reflective area and a transmissive area, wherein
    said LCD is a semi-transmissive type LCD driven by a signal where said transmissive area that is normally black and said reflective area that is normally white are inverted ON-OFF,
    said second substrate includes, in said transmissive area, a first electrode assembly that drives said LC layer in said transmissive area, and includes, in said reflective area, a reflection film and
    at least a part of a second electrode assembly that drives said LC layer in said reflective area, and said first and second substrates including first and second light shield members, respectively, wherein;
    said first drive electrode assembly and said second drive electrode assembly in-plane switch liquid crystal (LC) molecules of said LC layer in said transmissive area and said reflective area, respectively,
    said first drive electrode assembly including a first pixel electrode and a first common electrode, which are both transmissive electrodes, said second drive electrode assembly including a second pixel electrode and a second common electrode, which are both reflective electrodes, wherein a sequence of said LC molecules is changed by applying signals between said first pixel electrode and said first common electrode, and said second pixel electrode and said second common electrode, the signals being inverted ON-OFF, said first light shield member being disposed at a boundary between said reflective area and said transmissive area in said first substrate and the vicinity thereof, so as to suppress light incident from a visually recognized side of said reflective area from being emitted in a direction of said transmissive area, and said second light shield member being provided at a boundary between said transmissive area and said reflective area on said second substrate and the vicinity thereof, and being provided on a lower layer of said second substrate than said first drive electrode assembly and said second drive electrode assembly so as to suppress light leakage arising from light reflected by said first light shield member, wherein the light reflected by said first light shield member is incident from a backlight through a boundary portion between said transmissive area and said reflective area which is normally white, wherein said second substrate includes a gate signal line, a first common-electrode line and a drain line that underlies said first pixel electrode and said first common electrode in the transmissive area, said first pixel electrode and said first common electrode are partially overlapped by said gate signal line, said first common-electrode line and said drain line respectively, and wherein said second light shield member is configured by any one of a stack of said gate signal line and said reflection film, a stack of said first common-electrode line and said reflection film, and a stack of said drain line and said reflection film.

2. The LCD unit according to claim 1, wherein said first and second light shield members are configured by a metallic film having a surface treated for reduction of reflectance or a resin film that includes therein carbon additives, respectively.

3. The LCD unit according to claim 1, wherein said second substrate includes a gate signal line, a common-electrode line and a data signal line that underlie said reflection film, and said second light shield member of said second substrate is configured by a stack of at least two films selected from the group consisting of said reflection film, gate signal line, common-electrode line and data signal line.

4. The LCD unit according to claim 3, wherein said second light shield member of said second substrate includes a stack of said reflection film and gate signal line, a stack of said reflection film and data signal line, or a stack of said reflection film and common-electrode line.

5. The LCD unit according to claim 1, wherein said reflection film underlies said second drive electrode assembly in said second substrate, and said second light shield member of said second substrate underlies said reflection film.

6. The LCD unit according to claim 1, wherein said second light shield member of said second substrate ranges between an edge of said reflection film and a position of said transmissive area which is 4 μm or more apart in a direction opposite to said reflective area from an edge of said transparent film nearest to said reflective area.

7. The LCD unit according to claim 1, wherein said second light shield member of said second substrate ranges between an edge of said reflection film and a position of said transmissive area which is 4 μm or more apart in a direction opposite to said reflective area from an edge of said transparent film in said transmissive area nearest to said reflective area.

* * * * *